United States Patent
Breiner et al.

(10) Patent No.: US 8,420,709 B2
(45) Date of Patent: Apr. 16, 2013

(54) COATING COMPOSITION, (METH)ACRYLIC POLYMER AND MONOMER MIXTURE FOR PRODUCING THE (METH)ACRYLIC POLYMER

(75) Inventors: Christine Maria Breiner, Laudenbach (DE); Gerold Schmitt, Aschaffenburg (DE); Thorben Schuetz, Seeheim-Jugenheim (DE); Joachim Knebel, Alsbach-Haehnlein (DE); Ina Zwierzchowski, Weiterstadt (DE); Margarita Stein, Aschaffenburg (DE)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 13/254,009

(22) PCT Filed: Mar. 30, 2010

(86) PCT No.: PCT/EP2010/054139
§ 371 (c)(1),
(2), (4) Date: Aug. 31, 2011

(87) PCT Pub. No.: WO2010/112474
PCT Pub. Date: Oct. 7, 2010

(65) Prior Publication Data
US 2011/0318595 A1    Dec. 29, 2011

(30) Foreign Application Priority Data
Mar. 30, 2009 (DE) .......... 10 2009 001 966

(51) Int. Cl.
*C08F 299/02* (2006.01)
*C09D 129/12* (2006.01)

(52) U.S. Cl.
USPC ............... 522/65; 522/68; 522/114; 522/116; 522/150; 522/153; 522/154; 428/522; 427/508; 526/316; 526/318.4; 526/328

(58) Field of Classification Search .......... 522/150, 522/152, 153, 154, 65, 68, 114, 116; 526/316, 526/318.4, 328; 427/508; 428/522
See application file for complete search history.

(56) References Cited

U.S. PATENT DOCUMENTS

| 4,948,819 | A  | 8/1990  | Green et al. |
| 5,750,751 | A  | 5/1998  | Saam |
| 6,177,510 | B1 | 1/2001  | Saam |
| 2005/0228062 | A1 | 10/2005 | Wolf et al. |
| 2007/0276108 | A1 | 11/2007 | Hyde |
| 2010/0006217 | A1 | 1/2010  | Slark et al. |

FOREIGN PATENT DOCUMENTS

| EP | 0 333 291 | 9/1989 |
| EP | 1 044 993 | 10/2000 |
| EP | 1 930 362 | 6/2008 |
| WO | 03 091287 | 11/2003 |

OTHER PUBLICATIONS

International Search Report issued May 28, 2010 in PCT/EP10/054139 filed Mar. 30, 2010.
U.S. Appl. No. 13/259,184, filed Sep. 23, 2011, Schmitt, et al.
U.S. Appl. No. 13/257,178, filed Sep. 16, 2011, Maus, et al.

*Primary Examiner* — Peter D Mulcahy
(74) *Attorney, Agent, or Firm* — Oblon, Spivak, McClelland, Maier & Neustadt, L.L.P.

(57) ABSTRACT

The present invention relates to a coating composition comprising at least one photo-initiator and at least one (meth) acryl-polymer having units that are derived from (meth)acryl-monomers that have at least one double bond and 8 to 40 carbon atoms in the alkyl residue. The present invention furthermore relates to a monomer mixture comprising at least one (meth)acryl-monomer having at least one double bond and 8 to 40 carbon atoms in the alkyl residue and at least one photo-initiator monomer and a (meth)acryl-polymer that can be obtained by polymerization of said monomer mixture. The present invention furthermore relates to a method for producing a coating. The present invention furthermore relates to a coated object comprising a coating obtained by said method.

23 Claims, No Drawings

COATING COMPOSITION, (METH)ACRYLIC POLYMER AND MONOMER MIXTURE FOR PRODUCING THE (METH)ACRYLIC POLYMER

The present invention relates to a coating composition, to a (meth)acrylic polymer and to a monomer mixture for preparing the (meth)acrylic polymer. The present invention is further directed to a process for producing a coating, carried out using the coating material, and to an article obtainable thereby.

Coating materials, more particularly paints, have been prepared synthetically for a long time. One important group of these materials is based on aqueous dispersions which often comprise (meth)acrylate polymers. For example, the publication DE-A-41 05 134 describes aqueous dispersions comprising alkyl methacrylates as binders. Moreover, paints of this kind are known from U.S. Pat. No. 5,750,751, EP-A-1 044 993 and WO 2006/013061. Moreover, from publication DE-A-27 32 693, in particular, coating materials based on solvents are known. Moreover, in Laid-Open Specification WO 98/033855, reactive paints are described that can be cured by UV exposure.

The spectrum of properties exhibited by the coating materials set out above is already good. Nevertheless, an ongoing requirement exists to improve this spectrum of properties. For example, the compositions set out above take a relatively long time for the coatings obtained to be dust-dry or tack-free. This is true in particular of those coating materials which can be crosslinked oxidatively by oxygen. It is true that these drying times can be shortened by addition of large quantities of siccatives. But that diminishes other properties of the coating materials, particularly the processing properties, the shelf life, and, depending on the nature of the siccatives employed, the environmental compatibility. As far as the processing properties and shelf life are concerned, it is found that contact with atmospheric oxygen leads very rapidly to crosslinking of the unsaturated fatty acids if there are high concentrations of siccatives in the coating material. These coating materials therefore have a very short pot life and must be processed within a very short time after the containers have been opened. If small amounts of siccatives are used, these coating materials do exhibit a good shelf life and good processing properties, but take a very long time until the applied films are dust-dry or tack-free, with the consequence that coated articles have to be stored for a relatively long time until they can be processed further or used.

The curing of the coating materials described in WO 98/033855, which can be cured by UV exposure, involves very high irradiation energies and the absence of oxygen. Without these high light energies, or in the presence of oxygen, coatings are often obtained whose resistance towards solvents is low. The processing of these coating materials, accordingly, is relatively costly and inconvenient.

In view of the prior art, then, it is an object of the present invention to provide coating compositions having outstanding properties. These properties include more particularly very good processing properties and shelf life of the coating compositions. In particular the coatings obtainable from the coating compositions ought after a very short time to be dust-dry and tack-free. Moreover, based on the dust-dry time, the coating compositions ought to have a long pot life, meaning that the coating composition can be processed for a relatively long time after the container has been opened.

Furthermore, the coatings obtainable from the coating compositions ought to exhibit a high level of chemical resistance. In this context there ought to be a high stability achieved with respect to numerous different solvents and also with respect to bases and acids. In particular, there ought to be a very good resistance towards organic solvents.

Furthermore, the hardness of the coatings obtainable from the coating compositions ought to be able to be varied over a wide range. In particular it ought to be possible from the coating compositions to obtain particularly hard, scratch-resistant coatings. In addition, coatings obtainable from the coating compositions of the invention ought to have a relatively low brittleness relative to the hardness.

In addition, therefore, it was an object of the present invention to provide a coating composition which has a particularly long storage life and shelf life. A further object is considered that of being the provision of coating compositions that lead to coatings having a high gloss. The coatings obtainable from the coating compositions ought to exhibit high weathering stability, in particular a high level of UV resistance.

In relation to their performance capacity, the coating compositions ought to display improved environmental compatibility. In particular the amounts of organic solvents released into the environment as a result of evaporation ought to be as small as possible. Furthermore, the coating compositions ought to have a low residual monomer content.

A further object can be considered that of specifying coating compositions which can be obtained very cost-effectively and industrially.

These and also further objects which, though not mentioned explicitly, are nevertheless readily derivable or comprehensible from the circumstances discussed at the outset herein are achieved by a coating composition having all of the features of claim 1. Advantageous modifications of the coating composition of the invention are protected in dependent claims. With regard to preferred polymers that may be present in the coating composition, monomer mixtures for preparing preferred polymers, a process for producing a coating, and a coated article, claims 14, 17, 21 and 23 provide achievement of the objects on which they are based.

The present invention accordingly provides a coating composition which is characterized in that the composition comprises at least one photoinitiator and at least one (meth)acrylic polymer having units derived from (meth)acrylic monomers which in the alkyl radical have at least one double bond and 8 to 40 carbon atoms.

Through the measures according to the invention it is additionally possible to obtain advantages which include the following:

The coating compositions of the invention exhibit outstanding processing properties.

Thus, films formed from the coating materials of the invention are dust-dry and tack-free after a relatively short time. Relative to the dust-dry time, the coating compositions of the invention have a long pot life, and so the coating materials can be stored for a long time even after the stock containers have been opened.

The coatings obtainable from the coating compositions of the present invention exhibit high chemical resistance and increased weathering stability and also a high blocking resistance and rapid tack-free and dust-free status. In this context it is possible to achieve a high stability with respect to water and many different organic solvents and also with respect to bases and acids. In many cases in particular there is very good resistance towards methyl isobutyl ketone (MIBK) and other organic solvents. Hence preferred coatings score an outstanding grading in particular in experiments in accordance with the DIN 68861-1 furniture test. The wet adhesion of the coating material, furthermore, is high. The coatings obtainable from the coating material are distinguished by a low level of water absorption. Depending on substrate and coating, furthermore, the coated article has a high water permeability, particularly with respect to water vapour. Thus, in particular, textiles can be provided with the coating materials without excessive detriment to the water vapour permeability.

The hardness of the coatings obtainable from the coating compositions, furthermore, can be varied over a wide range. In particular it is possible to obtain particularly hard, scratch-resistant coatings.

Moreover, coatings obtainable from the coating materials of the invention have a relatively low brittleness relative to the hardness and the chemical resistance.

In relation to their performance, the coating compositions exhibit improved environmental compatibility. Hence extremely small amounts of organic solvents are released to the environment as a result of evaporation. Particularly preferred embodiments exhibit no release of organic solvents to the atmosphere. Furthermore, the coating materials have a low residual monomer content. These coating compositions may comprise a high solids content.

Coating compositions of the invention, moreover, lead to coatings having a high gloss. The coating materials of the present invention exhibit a particularly long storage life and shelf life. The coatings obtainable from the coating compositions display high weathering stability, more particularly a high UV resistance. Furthermore, the coating materials of the invention are obtainable particularly inexpensively and industrially.

A coating composition of the invention comprises at least one photoinitiator. Photoinitiators are compounds which on exposure to electromagnetic waves are able to form active species. Without intending to impose any restriction, it is normally assumed that the active species are able to initiate free-radical processes which promote curing of the coating composition. Preferred photoinitiators may be activated by exposure to light having a wavelength in the range from 200 to 800 nm.

A particular feature of preferred photoinitiators is that a composition comprising at least 95%, preferably at least 98%, by weight of ethoxylated pentaerythritol tetraacrylate, with the CAS No. 51728-26-8 (PPTTA; available commercially from Akcros Chemicals under the trade name Actilane 440; available commercially from Cytec under the trade name Ebecryl 40; available commercially from Rahn AG under the trade name Genomer 1456; and available commercially from Sartomer under the trade name SR 494) and 2% by weight of photoinitiator, if desired in combination with a coinitiator, the amounts of PPTTA, photoinitiator and, where used, coinitiator adding up to 100% by weight, leads to complete curing following exposure to light at a wavelength at which the photoinitiator exhibits the maximum absorption, and a luminous intensity of 15 mW/cm$^2$. The polymerization in this case is performed in the absence of oxygen on a film with a thickness of 40 to 80 µm which is exposed for 20 to 60 seconds. A coating obtainable from this composition preferably has a pendulum hardness of at least 40 s, more preferably at least 90 s, measured in accordance with DIN ISO 1522.

Preferred photoinitiators may often comprise a ketone functionality and an aromatic group. Often photoinitiators are distinguished via the assumed mechanism of action, without any intention that this should impose a restriction.

The type I photoinitiators, which are assumed to involve α-splitting, include, in particular, thioxanthone and derivatives of this compound, more particularly isopropylthioxanthone (ITX), fluorenone and derivatives of this compound, anthraquinone and derivatives of this compound, xanthone and derivatives of this compound, benzoins and benzoin derivatives, more particularly benzoin ethers, such as benzoin alkyl ethers, benzil ketals, more particularly benzil dimethyl ketals, acylphosphine oxides, more particularly 2,4,6-trimethylbenzoyldiphenylphosphine oxide, bisacylphosphine oxides, phenylglyoxylic esters, alpha-aminoalkylphenones, alpha,alpha-dialkoxyacetophenones and alpha-hydroxyalkylphenones, and benzimidazoles.

The type II photoinitiators, which are assumed to involve hydrogen transfer, include, among others, benzophenone and derivatives of this compound, such as alkylbenzophenones, diphenoxybenzophenones, amino-functionalized benzophenones, for example 4,4'-bis(dimethylamino)benzophenone (Michier's ketone), and halogenated benzophenones, and anthrone, camphorquinone and derivatives of this compound, benzil and phenylpropanedione. The type II photoinitiators can be employed preferably in combination with amines, preferably tertiary amines.

Also preferred are photoinitiators of Norrish II type, which can be used preferably in combination with an amine.

In one particular embodiment it is possible to make use in particular of low molecular weight photoinitiators, which preferably have a molecular weight of less than 1000 g/mol, more preferably of up to 800 g/mol.

The preferred photoinitiators include, in particular, mono- or bisacylphosphine oxides such as, for example, diphenyl-2,4,6-trimethylbenzoylphosphine oxide, bis(2,4,6-trimethylbenzoyl)phenylphosphine oxide (®IRGACURE 819), bis(2,6-dimethoxybenzoyl)-2,4,4-trimethylpentylphosphine oxide; α-hydroxyketones, such as 1-hydroxycyclohexyl phenyl ketone (®IRGACURE 184), 2-hydroxy-2-methyl-1-phenyl-1-propanone (®DAROCUR 1173), 2-hydroxy-1-[4-(2-hydroxyethoxy)phenyl]-2-methyl-1-propanone (®IRGACURE 2959); α-aminoketones, such as 2-methyl-1-[4-(methylthio)phenyl]-2-(4-morpholinyl)-1-propanone (®IRGACURE 907), 2-benzyl-2-(dimethylamino)-1-[4-(4-morpholinyl)phenyl]-1-butanone (®IRGACURE 369), 2-(4-methylbenzyl-2-(dimethylamino)-1-[4-(4-morpholinyl)phenyl]-1-butanone, 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)benzophenone, 4-chlorobenzophenone, 4-phenylbenzophenone, 4,4'-bis(dimethylamino)benzophenone, 4,4'-bis(diethylamino)benzophenone, methyl 2-benzoyl benzoate, 3,3'-dimethyl-4-methoxybenzophenone, 4-(4-methylphenylthio)benzophenone, 2,4,6-trimethyl-4'-phenylbenzophenone, 3-methyl-4'-phenylbenzophenone and also ketal compounds, e.g. 2,2-dimethoxy-1,2-diphenylethanone (®IRGACURE 651); monomeric or dimeric phenylglyoxylic esters, such as methylphenylglyoxylic esters, for example, 5,5'-oxo-di(ethyleneoxydicarbonylphenyl) or 1,2-(benzoylcarboxy)ethane. Particularly suitable are mixtures with mono- or bisacylphosphine oxides and/or α-hydroxyketones.

In addition it is possible to use the photoinitiators described in WO 2003/091287, filed at the European Patent Office on Apr. 17, 2003 with the application number PCT/EP03/04035, and hence this publication, especially the photoinitiators described therein, is incorporated for purposes of disclosure into the present specification.

Chemical derivatives of these photoinitiators are suitable, as are mixtures of these photoinitiators.

Particular advantages can be obtained in particular with photoinitiators which have a molecular weight of greater than or equal to 1000 g/mol, more particularly greater than or equal to 2000 g/mol.

Photoinitiators having a molecular weight of at least 1000 g/mol, also referred to below as polymeric photoinitiators, may be obtained by polymerization of mixtures which comprise photoinitiator monomers. Photoinitiator monomers are photoinitiators having at least one carbon-carbon double bond which is free-radically polymerizable.

Polymeric photoinitiators or copolymerized photoinitiators result in coatings that are particularly environment-friendly and unobjectionable from the standpoint of health, since these photoinitiators do not lead to migration of constituents into the environment. This property is important in particular in connection with printing inks or coatings for food packaging, since no constituents are released into the foods. Surprisingly, polymeric photoinitiators lead to coatings which have a particularly high solvent resistance and excellent mechanical properties. Moreover, coating materials which comprise these polymeric photoinitiators display particularly good processing properties and shelf life.

The preferred photoinitiator monomers include (meth)acrylates having a keto group, of the general formula I

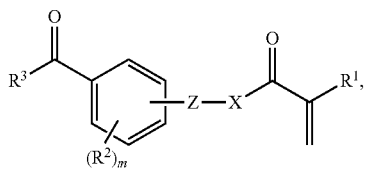

in which $R^1$ is hydrogen or methyl, X is oxygen or a group of formula NR', in which R' is hydrogen or a radical having 1 to 6 carbon atoms, Z is a bond or a linking group, $R^2$ is hydrogen, halogen, hydroxyl or a radical having 1 to 20 carbon atoms, m is an integer in the range from 0 to 4 and $R^3$ is a radical having 1 to 20 carbon atoms.

Of particular interest for the polymers of the invention are monomers of the formula (I) wherein the radical $R^1$ is methyl.

The group Z in formula (I) is preferably a bond or a group having 1 to 2000 carbon atoms, preferably 1 to 1000 carbon atoms and more preferably 1 to 500 carbon atoms.

The preferred linking groups Z include, in particular, groups of the formula (II)

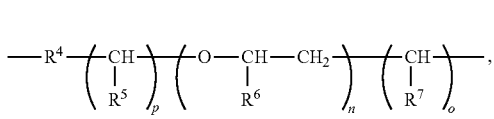

in which $R^4$ is a bond, oxygen, sulphur or a group of the formula NR', in which R' is hydrogen or a radical having 1 to 6 carbon atoms, O—CO—O, HN—CO—O, HN—CO—NH or a linking group having 1 to 20 carbon atoms; $R^5$, $R^6$, $R^7$ independently of one another are hydrogen or methyl, n is an integer from 0 to 200, preferably 1 to 100, and o and p independently of one another are an integer from 0 to 2.

Preferably the radical $R^2$ in formula (I) is a hydrogen or a radical having 1 to 20 carbon atoms. The group $R^3$ in formula (I) is preferably an aromatic or heteroaromatic radical, particular preference being given to aryl radicals, phenyl radicals more particularly.

Of interest in this context in particular are monomers in which the group $R^3$ is an aromatic or heteroaromatic radical and the linking group Z corresponds to formula (II) where n is an integer in the range from 1 to 20.

In one particular aspect of the present invention the group $R^3$ is an aromatic or heteroaromatic radical and the linking group Z is a bond.

In one particular aspect of the present invention it is possible more particularly to use (meth)acrylates having a keto group, of the general formula (III)

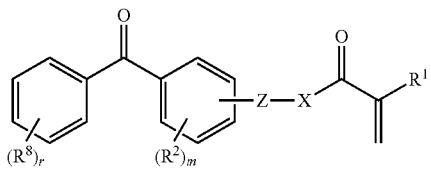

in which $R^1$ is hydrogen or methyl, X is oxygen or a group of the formula NR', in which R' is hydrogen or a radical having 1 to 6 carbon atoms, Z is a bond or a linking group, $R^2$ is hydrogen, halogen, hydroxyl or a radical having 1 to 20 carbon atoms, m is an integer in the range from 0 to 4, $R^8$ is hydrogen, halogen, hydroxyl or a radical having 1 to 20 carbon atoms, and r is an integer in the range from 0 to 5.

The radicals which have 1 to 20 carbon atoms include, in a non-exhaustive recitation, (C1-C20)-alkyl, (C1-C20)-alkoxy, (C1-C20)-alkthio, (C2-C20)-alkenyl, (C2-C20)-alkynyl, aryl or heterocyclyl, it being possible for the aryl or heterocyclyl radicals to be unsubstituted or to be provided with up to three or else, in the case of fluorine, up to the maximum number of identical or different radicals, and it being possible in the stated alkyl, alkenyl or alkynyl radicals for one or more, preferably up to three, non-adjacent saturated carbon units to be replaced by heteroatom units, such as oxygen or sulphur, and in which, moreover, 3 to 6 atoms of these hydrocarbon radicals, modified as above if desired, may form a ring, and these hydrocarbon radicals, with or without the stated variations, may be substituted, if desired, by one or more, preferably up to three or, in the case of halogen, up to the maximum number of identical or different radicals from the series of hydroxyl (—OH), carboxyl (—COOH), formyl, cyano (—CN), sulphonate ($SO_3H$), halogen, preferably fluorine, aryl, aryloxy, arylthio, (C3-C8)-cycloalkoxy, (C3-C8)-cycloalkylthio, heterocyclyl, heterocyclyloxy or (C1-C2)-alkoxycarbonyl, it being possible for the cycloaliphatic, aromatic or heterocyclic ring systems among the just-cited substituents to be unsubstituted or provided with up to three or else, in the case of fluorine, up to the maximum number of identical or different substituents.

By the expression "(C1-C20)-alkyl" is meant an unbranched or branched hydrocarbon radical having 1 to 20 carbon atoms, such as the methyl, ethyl, propyl, isopropyl, 1-butyl, 2-butyl, 2-methylpropyl or tert-butyl radical; and also, for example, the pentyl, 2-methylbutyl, 1,1-dimethylpropyl, hexyl, heptyl, octyl, or the 1,1,3,3-tetramethylbutyl radical; and also, for example, the nonyl, 1-decyl, 2-decyl, undecyl, dodecyl, pentadecyl or eicosyl radical; by the expression "(C1-C20)-alkoxy" is meant an alkyl group having 1 to 20 carbon atoms which is linked via an oxygen atom; by the expression "(C1-C20)-alkthio" is meant an alkyl group having 1 to 20 carbon atoms which is linked via a sulphur atom; by the expression "(C2-C20)-alkenyl" is meant, for example, the vinyl, allyl, 2-methyl-2-propenyl or 2-butenyl group; and also, for example, the 2-pentenyl, 2-decenyl or the 2-eicosenyl group; by the expression "(C2-C20)-alkynyl" is meant, for example, the ethynyl, propargyl, 2-methyl-2-propynyl or 2-butynyl group; and also, for example, the 2-pentynyl or the 2-decynyl group; and by the expression "aryl" is meant an isocyclic aromatic radical having preferably 6 to 14, more particularly 6 to 12, C atoms, such as phenyl, naphthyl or biphenylyl, for example, preferably phenyl.

By the expression "aryloxy" is meant, for example, the phenoxy or 1- or 2-naphthyloxy group; by the expression "arylthio" is meant, for example, the phenylthio or 1- or 2-naphthylthio group; by the expression "(C3-C8)-cycloalkoxy" is meant a cyclopropyl, cyclobutyl, cyclopentyl, cyclohexyl, cycloheptyl or cyclooctyl group which is linked via an oxygen; and by the expression "(C3-C8)-cycloalkylthio" is meant a cyclopropyl, cyclobutyl, cyclopentyl, cyclohexyl, cycloheptyl or cyclooctyl group which is linked via a sulphur atom.

By the expression "heterocyclyl" is meant a heteroaromatic or heteroaliphatic ring system, with a "heteroaromatic ring system" being an aryl radical in which at least one CH group is replaced by N and/or at least two adjacent CH groups are replaced by S, NH or O, for example a radical of thiophene, furan, pyrrole, thiazole, oxazole, imidazole, isothiazole, isoxazole, pyrazole, 1,3,4-oxadiazole, 1,3,4-thiadiazole, 1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, pyrazine, pyrimidine, pyridazine, 1,3,5-triazine, 1,2,4-triazine, 1,2,4,5-triazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or 4H-quinolizine;

by the expression "heteroaliphatic ring system" is meant a cycloalkyl radical in which at least one carbon unit is replaced by O, S or a group NR", and R" is hydrogen, (C1-C4)-alkyl or aryl;

by the expression "heterocyclyloxy" is meant one of the above-stated heterocyclic radicals which are linked via an oxygen atom;

and by (C1-C2)-alkoxycarbonyl is meant the methoxycarbonyl or ethoxycarbonyl group.

With very particular advantage, use is made, for producing polymeric photoinitiators, of a 4-hydroxybenzophenone methacrylate, preferably 4-hydroxybenzophenonel 3EO-methacrylate, and/or of a methacryloyloxybenzophenone, more particularly 4-methacryloyloxybenzophenone.

The abovementioned (meth)acrylates having a keto group, of the general formulae (I) and (III), can be prepared, for example, by transesterifying (meth)acrylates or esterifying (meth)acrylic acid with corresponding aromatic keto compounds, more particularly benzophenone compounds, which have a hydroxyl group or an amino group. Also possible is the reaction of aromatic keto compounds, more particularly benzophenone compounds, which comprise hydroxyl or amine groups with reactive (meth)acrylates, more particularly (meth)acryloyl halides or (meth)acrylic anhydrides. In addition, particularly preferred photoinitiator monomers are set out in EP-A-333 291, filed at the European Patent Office on Mar. 14, 1989 under the application number 89200652.9, the photoinitiators and processes for their preparation that are set out therein being incorporated for purposes of disclosure into this specification. Furthermore, photoinitiator monomers in accordance with formula (I) above can be purchased, for example, under the trade name Ebecryl® P36 and Ebecryl® P38.

The polymeric photoinitiator can be prepared using other monomers, which can be preferably free-radically copolymerized with the photoinitiator monomers. These copolymerizable monomers include, among others, monomers having an acid group, monomers A comprising ester groups, and styrene monomers.

Monomers containing acid groups are compounds which can be copolymerized preferably free-radically with the abovementioned photoinitiator monomers. They include, for example, monomers having a sulphonic acid group, such as vinylsulphonic acid; monomers having a phosphonic acid group, such as vinylphosphonic acid; and unsaturated carboxylic acids, such as methacrylic acid, acrylic acid, fumaric acid and maleic acid, for example. Particularly preferred are methacrylic acid and acrylic acid. The monomers containing acid groups may be used individually or as a mixture of two, three or more monomers containing acid groups.

The preferred monomers A comprising ester groups include, in particular, (meth)acrylates other than the photoinitiator monomers, fumarates, maleates and/or vinyl acetate. The expression (meth)acrylates encompasses methacrylates and acrylates and also mixtures of both. These monomers are widely known.

The stated comonomers include, among others, (meth)acrylates having 1 to 10 carbon atoms in the alkyl radical that contain no double bonds or heteroatoms in the alkyl radical.

The (meth)acrylates having 1 to 10 carbon atoms in the alkyl radical that contain no double bonds or heteroatoms in the alkyl radical include, among others, (meth)acrylates having a linear or branched alkyl radical, such as, for example, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate and pentyl(meth)acrylate, hexyl(meth)acrylate, 2-ethylhexyl(meth)acrylate, heptyl(meth)acrylate, octyl(meth)acrylate, 3-isopropylheptyl(meth)acrylate, nonyl(meth)acrylate, decyl(meth)acrylate; and cycloalkyl(meth)acrylates, such as cyclopentyl(meth)acrylate, cyclohexyl(meth)acrylate, bornyl(meth)acrylate, norbornyl(meth)acrylate and isobornyl(meth)acrylate. The abovementioned (meth)acrylates having 1 to 10 carbon atoms in the alkyl radical may be used individually or as a mixture.

Another class of comonomers are (meth)acrylates having at least 11 carbon atoms in the alkyl radical that derive from saturated alcohols and contain no heteroatoms in the alkyl radical, such as, for example, undecyl(meth)acrylate, 5-methylundecyl(meth)acrylate, dodecyl(meth)acrylate, 2-methyldodecyl(meth)acrylate, tridecyl(meth)acrylate, 5-methyltridecyl(meth)acrylate, tetradecyl(meth)acrylate, pentadecyl(meth)acrylate, hexadecyl(meth)acrylate, 2-methylhexadecyl(meth)acrylate, heptadecyl(meth)acrylate, 5-isopropylheptadecyl(meth)acrylate, 4-tert-butyloctadecyl(meth)acrylate, 5-ethyloctadecyl(meth)acrylate, 3-isopropyloctadecyl(meth)acrylate, octadecyl(meth)acrylate, nonadecyl(meth)acrylate, eicosyl(meth)acrylate, cetyleicosyl(meth)acrylate, stearyleicosyl(meth)acrylate, docosyl(meth)acrylate and/or eicosyltetratriacontyl(meth)acrylate;

cycloalkyl (meth)acrylates, such as 2,4,5-tri-tert-butyl-3-vinylcyclohexyl(meth)acrylate, 2,3,4,5-tetra-tert-butylcyclohexyl(meth)acrylate; heterocyclic(meth)acrylates, such as 2-(1-imidazolyl)ethyl(meth)acrylate, 2-(4-morpholinyl)ethyl(meth)acrylate, 1-(2-methacryloyloxyethyl)-2-pyrrolidone, 2-(3-oxazolidinyl)ethyl methacrylate;

nitriles of (meth)acrylic acid and other nitrogen-containing methacrylates, such as N-(methacryloyloxyethyl)diisobutylketimine, N-(methacryloyloxyethyl)dihexadecylketimine, methacryloylamidoacetonitrile, 2-methacryloyloxyethylmethylcyanamide, cyanomethyl methacrylate;

aryl(meth)acrylates, such as benzyl(meth)acrylate or phenyl(meth)acrylate, it being possible for each of the aryl radicals to be unsubstituted or substituted up to four times; (meth)acrylates having a hydroxyl group in the alkyl radical, more particularly 2-hydroxyethyl(meth)acrylate, preferably 2-hydroxyethyl methacrylate (HEMA), hydroxypropyl(meth)acrylate, such as 2-hydroxypropyl(meth)acrylate and 3-hydroxypropyl(meth)acrylate, preferably hydroxypropyl methacrylate (HPMA), hydroxybutyl(meth)acrylate, preferably hydroxybutyl methacrylate (HBMA), 3,4-dihydroxybutyl(meth)acrylate,
2,5-dimethyl-1,6-hexanediol(meth)acrylate,
1,10-decanediol(meth)acrylate,
glycerol mono(meth)acrylate and polyalkoxylated derivatives of (meth)acrylic acid, more particularly polypropylene glycol mono(meth)acrylate having 2 to 10, preferably 3 to 6 propylene oxide units, preferably polypropylene glycol monomethacrylate having approximately 5 propylene oxide units (PPM5), polyethylene glycol mono(meth)acrylate having 2 to 10, preferably 3 to 6, ethylene oxide units, preferably polyethylene glycol monomethacrylate having approximately 5 ethylene oxide units (PEM5), polybutylene glycol mono(meth)acrylate, polyethylene glycol-polypropylene glycol mono(meth)acrylate;

(meth)acrylamides, more particularly N-methylol(meth)acrylamide, N,N-dimethylamino-propyl(meth)acrylamide, tert-butylaminoethyl methacrylate, methacrylamide and acrylamide;

glycerol carbonate methacrylate;
2-carbamoyloxyethyl methacrylate, and (meth)acrylates which derive from saturated fatty acids or fatty acid amides, such as (meth)acryloyloxy-2-hydroxypropyl-palmitic ester, (meth)acryloyloxy-2-hydroxypropyl-stearic ester and (meth)acryloyloxy-2-hydroxypropyl-lauric ester, pentadecyloyloxy-2-ethyl-(meth)acrylamide, heptadecyloyloxy-2-ethyl-(meth)acrylamide, (meth)acryloyloxy-2-ethyl-lauramide, (meth)acryloyloxy-2-ethyl-myristamide, (meth)acryloyloxy-2-ethyl-palmitamide, (meth)acryloyloxy-2-ethyl-stearamide, (meth)acryloyloxy-2-propyl-lauramide, (meth)acryloyloxy-2-propyl-myristamide, (meth)acryloyloxy-2-propyl-palmitamide and (meth)acryloyloxy-2-propyl-stearamide.

Another class of comonomers is represented by crosslinking monomers. These monomers have at least two double bonds with similar reactivity in the context of a free-radical polymerization. They include, in particular, (meth)acrylates derived from diols or higher polyfunctional alcohols, such as, for example, glycol di(meth)acrylates, such as ethylene glycol di(meth)acrylate, diethylene glycol di(meth)acrylate, triethylene glycol di(meth)acrylate, tetra- and polyethylene glycol di(meth)acrylate, 1,3-butanediol(meth)acrylate, 1,4-butanediol(meth)acrylate, 1,6-hexanediol di(meth)acrylate, glycerol di(meth)acrylate, dimethacrylates of ethoxylated bisphenol A and diurethane dimethacrylate; (meth)acrylates having three or more double bonds, such as glycerol tri(meth)acrylate, trimethylolpropane tri(meth)acrylate, pentaerythritol tetra(meth)acrylate and dipentaerythritol penta(meth)acrylate, for example.

The comonomers further include vinyl esters, such as vinyl acetate, vinyl chloride, vinyl versatate, ethylene-vinyl acetate, ethylene-vinyl chloride;

maleic acid derivatives, such as, for example, maleic anhydride, esters of maleic acid, such as dimethyl maleate, and methyl maleic anhydride; and fumaric acid derivatives, such as dimethyl fumarate.

Another group of comonomers are styrene monomers, such as, for example, styrene, substituted styrenes having an alkyl substituent in the side chain, such as α-methylstyrene and α-ethylstyrene, for example, substituted styrenes having an alkyl substituent on the ring, such as vinyltoluene and p-methylstyrene, halogenated styrenes, such as monochlorostyrenes, dichlorostyrenes, tribromostyrenes and tetrabromostyrenes, for example.

Heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

maleimide, methylmaleimide;
vinyl ethers and isoprenyl ethers; and vinyl halides, such as vinyl chloride, vinyl fluoride, vinylidene chloride and vinylidene fluoride, for example, are further examples of comonomers.

In accordance with one further aspect of the present invention the polymeric photoinitiator may be prepared using monomers which exhibit an accelerating effect on the photoinitiation. These monomers include more particularly accelerant amines which have at least one ethylenically unsaturated double bond. These monomers include, among others, 2-dimethylaminoethyl methacrylate (DMAEMA) and dimethylaminopropyl methacrylate (DMAPMA).

In accordance with one particular modification of the present invention, the polymeric photoinitiator may contain 0% to 10% by weight, more preferably 1% to 5% by weight and very preferably 1.5% to 4% by weight of units derived from monomers having an accelerating effect on the photoinitiation.

The molecular weight of polymeric photoinitiators may be situated within a wide range. Generally speaking, the weight-average molecular weight is typically at least 1000 g/mol, preferably at least 2000 g/mol and very preferably at least 5000 g/mol. In accordance with one first aspect of the present invention it is possible, for example, to use polymeric photoinitiators which have a relatively high molecular weight. These polymeric photoinitiators may be obtained in particular by emulsion polymerization, and may have a weight-average molecular weight, for example, in the range from 100 000 to 10 000 000 g/mol, more preferably in the range from 200 000 to 500 000 g/mol. Emulsion polymers are notable in particular for a high level of environmental compatibility, since in many cases they require no organic solvents and can have a particularly low residual monomer content.

The fraction of units derived from photoinitiator monomers in the polymeric photoinitiators may be situated within a wide range. It is possible, for instance, to use compounds which are composed entirely of units derived from photoinitiator monomers. Therefore the polymeric photoinitiator may comprise 0.1% to 100% by weight, preferably 0.5% to 50% by weight and very preferably 1% to 10% by weight of units derived from photoinitiator monomers, based on the weight of the polymeric photoinitiator.

The polymeric photoinitiators may be obtained preferably by free-radical polymerization. Accordingly the weight fraction of the respective units containing these polymers is made up of the weight fractions of corresponding monomers that are used in preparing the polymers, since the weight fraction of groups derived from initiators or molecular weight regulators can typically be disregarded.

A coating material of the invention further comprises at least one (meth)acrylic polymer having units derived from (meth)acrylic monomers which in the alkyl radical have at least one double bond and 8 to 40 carbon atoms.

(meth)acrylic monomers which in the alkyl radical have at least one double bond and 8 to 40 carbon atoms are esters or amides of (meth)acrylic acid whose alkyl radical contains at least one carbon-carbon double bond which is not part of an aromatic system, and 8 to 40 carbon atoms. The (meth)acrylic acid notation denotes methacrylic and acrylic acid and also mixtures thereof. The alkyl or alcohol or amide radical may have preferably 10 to 30 and more preferably 12 to 20 carbon atoms, and this radical may comprise heteroatoms, more particularly oxygen, nitrogen or sulphur atoms. The alkyl radical may have one, two, three or more carbon-carbon double bonds. The polymerization conditions under which the (meth)acrylic polymer is prepared are preferably chosen so as to maximize the proportion of the double bonds of the alkyl radical that are retained in the polymerization. This can be done, for example, by sterically hindering the double bonds present in the alcohol radical. In addition, at least some and preferably all of the double bonds present in the alkyl radical of the (meth)acrylic monomer have a lower reactivity in a free-radical polymerization than a (meth)acrylic group, and so in the alkyl radical there are preferably no further (meth) acrylic groups present.

The iodine number of the (meth)acrylic monomers used to prepare the (meth)acrylic polymers and having in the alkyl radical at least one double bond and 8 to 40 carbon atoms is preferably at least 50, more preferably at least 100 and very preferably at least 125 g iodine/100 g (meth)acrylic monomer.

(meth)acrylic monomers of this kind conform in general to the formula (IV)

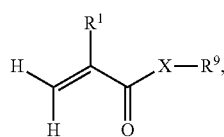

(IV)

in which radical $R^1$ is hydrogen or methyl, X independently is oxygen or a group of the formula NR', in which R' is hydrogen or a radical having 1 to 6 carbon atoms, and $R^9$ is a linear or branched radical having 8 to 40, preferably 10 to 30 and more preferably 12 to 20 carbon atoms and containing at least one C—C double bond. (meth)acrylic monomers which in the alkyl radical have at least one double bond and 8 to 40 carbon atoms may be obtained, for example, by esterifying (meth) acrylic acid, reacting (meth)acryloyl halides or (meth)acrylic anhydride or transesterifying (meth)acrylates with alcohols which have at least one double bond and 8 to 40 carbon atoms. Correspondingly, (meth)acrylamides can be obtained by reaction with an amine. These reactions are set out in, for example, Ullmann's Encyclopedia of Industrial Chemistry, 5$^{th}$ edition on CD-ROM, or in F. -B. Chen, G. Bufkin, "Crosslinkable Emulsion Polymers by Autooxidation I", Journal of Applied Polymer Science, Vol. 30, 4571-4582 (1985).

The alcohols suitable for this purpose include, among others, octenol, nonenol, decenol, undecenol, dodecenol, tridecenol, tetradecenol, pentadecenol, hexadecenol, heptadecenol, octadecenol, nonadecenol, eicosenol, docosenol, octadienol, nonadienol, decadienol, undecadienol, dodecadienol, tridecadienol, tetradecadienol, pentadecadienol, hexadecadienol, heptadecadienol, octadecadienol, nonadecadienol, eicosadienol and/or docosadienol. These so-called fatty alcohols are in some cases available commercially or may be obtained from fatty acids, this reaction being set out in, for example, F. -B. Chen, G. Bufkin, Journal of Applied Polymer Science, Vol. 30, 4571-4582 (1985).

The preferred (meth)acrylates obtainable by this process include, in particular, octadienyl(meth)acrylate, octadecadienyl(meth)acrylate, octadecanetrienyl(meth)acrylate, hexadecenyl(meth)acrylate, octadecenyl(meth)acrylate and hexadecadienyl(meth)acrylate.

Furthermore, (meth)acrylates which in the alkyl radical have at least one double bond and 8 to 40 carbon atoms can also be obtained by reacting unsaturated fatty acids with (meth)acrylates which have reactive groups in the alkyl radical, more particularly alcohol radical. The reactive groups include, in particular, hydroxyl groups and also epoxy groups. Accordingly it is possible to make use, for example, of hydroxyalkyl(meth)acrylates, such as 3-hydroxypropyl (meth)acrylate, 3,4-dihydroxybutyl(meth)acrylate, 2-hydroxyethyl(meth)acrylate, 2-hydroxypropyl(meth)acrylate, 2,5-dimethyl-1,6-hexanediol(meth)acrylate, 1,10-decanediol(meth)acrylate; or (meth)acrylates containing epoxy groups, such as glycidyl(meth)acrylate, for example, as reactants for preparing the aforementioned (meth)acrylates.

Suitable fatty acids for reaction with the aforementioned (meth)acrylates are in many cases available commercially and are obtained from natural sources. They include, among others, undecylenic acid, palmitoleic acid, oleic acid, elaidic acid, vaccenic acid, eicosenoic acid, cetoleic acid, erucic acid, nervonic acid, linoleic acid, linolenic acid, arachidonic acid, timnodonic acid, clupanodonic acid and/or cervonic acid.

The preferred (meth)acrylates obtainable by this process include, in particular, (meth)acryloyloxy-2-hydroxypropyl-linoleic ester, (meth)acryloyloxy-2-hydroxypropyl-linolenic ester and (meth)acryloyloxy-2-hydroxypropyl-oleic ester.

The reaction of the unsaturated fatty acids with (meth) acrylates which have reactive groups in the alkyl radical, more particularly alcohol radical, is known per se and set out in, for example, DE-A-41 05 134, DE-A-25 13 516, DE-A-26 38 544 and U.S. Pat. No. 5,750,751.

In accordance with one preferred embodiment it is possible to use (meth)acrylic monomers of the general formula (V)

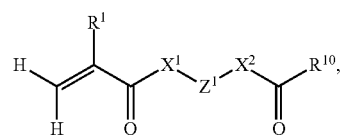

(V)

in which $R^1$ is hydrogen or a methyl group, $X^1$ and $X^2$ independently are oxygen or a group of the formula NR', in which R' is hydrogen or a radical having 1 to 6 carbon atoms, with the proviso that at least one of the groups $X^1$ and $X^2$ is a group of the formula NR', in which R' is hydrogen or a radical having 1 to 6 carbon atoms, $Z^1$ is a linking group, and $R^{10}$ is an unsaturated radical having 9 to 25 carbon atoms.

Surprising advantages can be achieved, furthermore, through the use of a (meth)acrylic monomer of the general formula (VI)

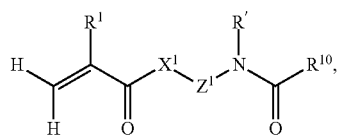

(VI)

in which $R^1$ is hydrogen or a methyl group, $X^1$ is oxygen or a group of the formula NR', in which R' is hydrogen or a radical having 1 to 6 carbon atoms, $Z^1$ is a linking group, R is hydrogen or a radical having 1 to 6 carbon atoms, and $R^{10}$ is an unsaturated radical having 9 to 25 carbon atoms.

The expression "radical having 1 to 6 carbon atoms" stands for a group which has 1 to 6 carbon atoms. It encompasses aromatic and heteroaromatic groups and also alkyl, cycloalkyl, alkoxy, cycloalkoxy, alkenyl, alkanoyl and alkoxycarbonyl groups, and also heteroaliphatic groups. The stated groups may be branched or unbranched. Moreover, these groups may have substituents, more particularly halogen atoms or hydroxyl groups.

The radicals R' are preferably alkyl groups. The preferred alkyl groups include the methyl, ethyl, propyl, isopropyl, 1-butyl, 2-butyl, 2-methylpropyl or tert-butyl group.

The group $Z^1$ in the formulae (V) and (VI) is preferably a linking group which comprises 1 to 10, preferably 1 to 5 and very preferably 2 to 3 carbon atoms. Such groups include, in particular, linear or branched, aliphatic or cycloaliphatic radicals, such as, for example, a methylene, ethylene, propylene, isopropylene, n-butylene, isobutylene, tert-butylene or cyclohexylene group, the ethylene group being particularly preferred.

The group $R^{10}$ in formula (V) and (VI) is an unsaturated radical having 9 to 25 carbon atoms. These groups comprise more particularly alkenyl, cycloalkenyl, alkenoxy, cycloalkenoxy, alkenoyl and also heteroaliphatic groups. Furthermore, these groups may have substituents, more particularly halogen atoms or hydroxyl groups. The preferred groups include, in particular, alkenyl groups, such as, for example, the nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, octadienyl, nonadienyl, decadienyl, undecadienyl, dodecadienyl, tridecadienyl, tetradecadienyl, pentadecadienyl, hexadecadienyl, heptadecadienyl, octadecadienyl, nonadecadienyl, eicosadienyl, heneicosadienyl, docosadienyl, tricosadienyl and/or heptadecatrienyl group.

The preferred (meth)acrylic monomers of formula (V) or (VI) include, among others, heptadecenyloyloxy-2-ethyl-(meth)acrylic amide, heptadecadienyloyloxy-2-ethyl-(meth)acrylamide, heptadecatrienyloyloxy-2-ethyl-(meth)acrylamide, heptadecenyloyloxy-2-ethyl-(meth)acrylamide, (meth)acryloyloxy-2-ethyl-palmitoleamide, (meth)acryloyloxy-2-ethyl-oleamide, (meth)acryloyloxy-2-ethyl-eicosenamide, (meth)acryloyloxy-2-ethyl-cetoleamide, (meth)acryloyloxy-2-ethyl-erucamide, (meth)acryloyloxy-2-ethyl-linoleamide, (meth)acryloyloxy-2-ethyl-linolenamide, (meth)acryloyloxy-2-propyl-palmitoleamide, (meth)acryloyloxy-2-propyl-oleamide, (meth)acryloyloxy-2-propyl-eicosenamide, (meth)acryloyloxy-2-propyl-cetoleamide, (meth)acryloyloxy-2-propyl-erucamide, (meth)acryloyloxy-2-propyl-linoleamide and (meth)acryloyloxy-2-propyl-linolenamide.

Particularly preferred monomers of the formula (V) or (VI) are methacryloyloxy-2-ethyl-oleamide, methacryloyloxy-2-ethyl-linoleamide and/or methacryloyloxy-2-ethyl-linolenamide.

The (meth)acrylic monomers of formula (V) or (VI) can be obtained in particular by multi-stage processes. In a first stage, for example, one or more unsaturated fatty acids or fatty acid esters can be reacted with an amine, such as ethylenediamine, ethanolamine, propylenediamine or propanolamine, for example, to give an amide. In a second stage the hydroxyl group or the amine group of the amide is reacted with a (meth)acrylate, methyl(meth)acrylate, for example, to give the monomers of the formula (V) or (VI). For the preparation of monomers in which $X^1$ is a group of the formula NR' in which R' is hydrogen or a radical having 1 to 6 carbon atoms and $X^2$ is oxygen, it is possible, correspondingly, first to react an alkyl(meth)acrylate, methyl(meth)acrylate for example, with one of the aforementioned amines, to give a (meth)acrylamide having a hydroxyl group in the alkyl radical, which is subsequently reacted with an unsaturated fatty acid to give a (meth)acrylic monomer of formula (V) or (VI). Transesterifications of alcohols with (meth)acrylates, or the preparation of (meth)acrylamides, are set out in documents including CN 1355161, DE 21 29 425, filed on Jun. 14, 1971 at the German Patent Office with the application number P 2129425.7, DE 34 23 443, filed on Jun. 26, 1984 at the German Patent Office with the application number P 3423443.8, or EP-A-0 534 666, filed on Sep. 16, 1992 at the European Patent Office with the application numner EP 92308426.3, the reaction conditions described in these publications, and also the catalysts, etc., set out therein, being incorporated for purposes of disclosure into this specification. In addition, these reactions are described in "Synthesis of Acrylic Esters by Transesterification", J. Haken, 1967.

Intermediates obtained in these reactions, such as carboxamides, with hydroxyl groups in the alkyl radical can be purified. In one particular embodiment of the present invention, intermediates obtained can be reacted without costly and inconvenient purification, to give the (meth)acrylic monomers of formula (V) or (VI).

The (meth)acrylic monomers having 8 to 40, preferably 10 to 30 and more preferably 12 to 20 carbon atoms and at least one double bond in the alkyl radical further include, in particular, monomers of the general formula (VII)

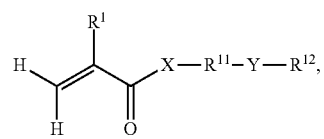

(VII)

in which $R^1$ is hydrogen or a methyl group, X is oxygen or a group of the formula NR', in which R' is hydrogen or a radical having 1 to 6 carbon atoms, $R^{11}$ is an alkylene group having 1 to 22 carbon atoms, Y is oxygen, sulphur or a group of the formula NR", in which R" is hydrogen or a radical having 1 to 6 carbon atoms, and $R^{12}$ is an unsaturated radical having at least 8 carbon atoms and at least two C—C double bonds.

In formula (VII) the radical $R^{11}$ is an alkylene group having 1 to 22 carbon atoms, preferably having 1 to 10, more preferably having 2 to 6 carbon atoms. In one particular embodiment of the present invention the radical $R^{11}$ is an alkylene group having 2 to 4, more preferably 2, carbon atoms. The alkylene groups having 1 to 22 carbon atoms include in particular the methylene, ethylene, propylene, isopropylene, n-butylene, isobutylene, tert-butylene or cyclohexylene group, the ethylene group being particularly preferred.

The radical $R^{12}$ comprises at least two C—C double bonds which are not part of an aromatic system. Preferably the radical $R^{12}$ is a group having precisely 8 carbon atoms and having precisely two carbon-carbon double bonds. The radical $R^{12}$ is preferably a linear hydrocarbon radical which contains no heteroatoms. In accordance with one particular embodiment of the present invention the radical $R^{12}$ in formula (VII) may comprise a terminal double bond. In another modification of the present invention the radical $R^{12}$ in formula (VII) may comprise no terminal carbon-carbon double bond. The double bonds present in the radical $R^{12}$ may preferably be conjugated. According to another preferred embodiment of the present invention the double bonds present in the radical $R^{12}$ are not conjugated. The preferred radicals $R^{12}$ having at least two double bonds include, among others, the octa-2,7-dienyl group, octa-3,7-dienyl group, octa-4,7-dienyl group, octa-5,7-dienyl group, octa-2,4-dienyl group, octa-2,5-dienyl group, octa-2,6-dienyl group, octa-3,5-dienyl group, octa-3,6-dienyl group and octa-4,6-dienyl group.

The (meth)acrylic monomers of the general formula (VII) include, among others, 2-[((2-E)octa-2,7-dienyl)methylamino]ethyl 2-methylprop-2-enoate, 2-[((2-Z)octa-2,7-dienyl)methylamino]ethyl 2-methylprop-2-enoate, 2-[((3-E)octa-3,7-dienyl)methylamino]ethyl 2-methylprop-2-enoate, 2-[((4-Z)octa-4,7-dienyl)methylamino]ethyl 2-methylprop-2-enoate, 2-[(octa-2,6-dienyl)methylamino]ethyl 2-methylprop-2-enoate, 2-[(octa-2,4-dienyl)methylamino]ethyl 2-methylprop-2-enoate, 2-[(octa-3,5-dienyl)methylamino]ethyl 2-methylprop-2-enoate, 2-[((2-E)octa-2,7-dienyl)methylamino]ethyl-(meth)acrylamide, 2-[((2-Z)octa-2,7-dienyl)methylamino]ethyl-(meth)acrylamide, 2-[((3-E)octa-3,7-dienyl)methylamino]ethyl-(meth)acrylamide, 2-[((4-Z)octa-4,7-dienyl)methylamino]ethyl-(meth)acrylamide, 2-[(octa-2,6-dienyl)methylamino]ethyl-(meth)acrylamide, 2-[(octa-2,4-dienyl)methylamino]ethyl-(meth)acrylamide, 2-[(octa-3,5-dienyl)methylamino]ethyl-(meth)acrylamide, 2-[((2-E)octa-2,7-dienyl)ethylamino]ethyl 2-methylprop-2-enoate, 2-[((2-Z)octa-2,7-dienyl)ethylamino]ethyl 2-methylprop-2-enoate, 2-[((3-E)octa-3,7-dienyl)ethylamino]ethyl 2-methylprop-2-enoate, 2-[((4-Z)octa-4,7-dienyl)ethylamino]ethyl 2-methylprop-2-enoate, 2-[(octa-2,6-dienyl)ethylamino]ethyl 2-methylprop-2-enoate, 2-[(octa-2,4-dienyl)ethylamino]ethyl 2-methylprop-2-enoate, 2-[(octa-3,5-dienyl)ethylamino]ethyl 2-methylprop-2-enoate, 2-[((2-E)octa-2,7-dienyl)methylamino]ethyl prop-2-enoate, 2-[((2-Z)octa-2,7-dienyl)methylamino]ethyl prop-2-enoate, 2-[((3-E)octa-3,7-dienyl)methylamino]ethyl prop-2-enoate, 2-[((4-Z)octa-4,7-dienyl)methylamino]ethyl prop-2-enoate, 2-[(octa-2,6-dienyl)methylamino]ethyl prop-2-enoate, 2-[(octa-2,4-dienyl)methylamino]ethyl prop-2-enoate, 2-[(octa-3,5-dienyl)methylamino]ethyl prop-2-enoate, 2-((2-E)octa-2,7-dienyloxy)ethyl 2-methylprop-2-enoate, 2-((2-Z)octa-2,7-dienyloxy)ethyl 2-methylprop-2-enoate, 2-((3-E)octa-3,7-dienyloxy)ethyl 2-methylprop-2-enoate, 2-((4-Z)octa-4,7-dienyloxy)ethyl 2-methylprop-2-enoate, 2-(octa-2,6-dienyloxy)ethyl 2-methylprop-2-enoate, 2-(octa-2,4-dienyloxy)ethyl 2-methylprop-2-enoate, 2-(octa-3,5-dienyloxy)ethyl 2-methylprop-2-enoate, 2-((2-E)octa-2,7-dienyloxy)ethyl prop-2-enoate, 2-((2-Z)octa-2,7-dienyloxy)ethyl prop-2-enoate, 2-((3-E)octa-3,7-dienyloxy)ethyl prop-2-enoate, 2-((4-Z)octa-4,7-dienyloxy)ethyl prop-2-enoate, 2-(octa-2,6-dienyloxy)ethyl prop-2-enoate, 2-(octa-2,4-dienyloxy)ethyl prop-2-enoate and 2-(octa-3,5-dienyloxy)ethyl prop-2-enoate.

The above-recited (meth)acrylic monomers of formula (V) can be obtained in particular by processes in which (meth)acrylic acid or a (meth)acrylate, more particularly methyl (meth)acrylate or ethyl(meth)acrylate, is reacted with an alcohol and/or an amine. These reactions have been set out above.

The reactant to be reacted with the (meth)acrylic acid or the (meth)acrylate may advantageously conform to the formula (VIII)

$$H—X—R^{11}—Y—R^{12} \qquad (VIII)$$

in which X is oxygen or a group of the formula NR', in which R' is hydrogen or a radical having 1 to 6 carbon atoms, $R^{11}$ is an alkylene group having 1 to 22 carbon atoms, Y is oxygen, sulphur or a group of the formula NR", in which R" is hydrogen or a radical having 1 to 6 carbon atoms, and $R^{12}$ is an at least doubly unsaturated radical having at least 8 carbon atoms.

With regard to the definition of preferred radicals R', R", $R^{11}$, Y and $R^{12}$, reference is made to the description of the formula (VII).

The preferred reactants of formula (VIII) include (methyl (octa-2,7-dienyl)amino)ethanol, (ethyl(octa-2,7-dienyl)amino)ethanol, 2-octa-2,7-dienyloxyethanol, (methyl(octa-2,7-dienyl)amino)ethylamine, (methyl(octa-3,7-dienyl)amino)ethanol, (ethyl(octa-3,7-dienyl)amino)ethanol, 2-octa-3,7-dienyloxyethanol, (methyl(octa-3,7-dienyl)amino)ethylamine, (methyl(octa-4,7-dienyl)amino)ethanol, (ethyl(octa-4,7-dienyl)amino)ethanol, 2-octa-4,7-dienyloxyethanol, (methyl(octa-4,7-dienyl)amino)ethylamine, (methyl(octa-5,7-dienyl)amino)ethanol, (ethyl(octa-5,7-dienyl)amino)ethanol, 2-octa-5,7-dienyloxyethanol, (methyl(octa-5,7-dienyl)amino)ethylamine, (methyl(octa-2,6-dienyl)amino)ethanol, (ethyl(octa-2,6-dienyl)amino)ethanol, 2-octa-2,6-dienyloxyethanol, (methyl(octa-2,6-dienyl)amino)ethylamine, (methyl(octa-2,5-dienyl)amino)ethanol, (ethyl(octa-2,5-dienyl)amino)ethanol, 2-octa-2,5-dienyloxyethanol, (methyl(octa-2,5-dienyl)amino)ethylamine, (methyl(octa-2,4-dienyl)amino)ethanol, (ethyl(octa-2,4-dienyl)amino)ethanol, 2-octa-2,4-dienyloxyethanol, (methyl(octa-2,4-dienyl)amino)ethylamine, (methyl(octa-3,6-dienyl)amino)ethanol, (ethyl(octa-3,6-dienyl)amino)ethanol, 2-octa-3,6-dienyloxyethanol, (methyl(octa-3,6-dienyl)amino)ethylamine, (methyl(octa-3,5-dienyl)amino)ethanol, (ethyl(octa-3,5-dienyl)amino)ethanol, 2-octa-3,5-dienyloxyethanol, (methyl(octa-3,5-dienyl)amino)ethylamine, (methyl(octa-4,6-dienyl)amino)ethanol, (ethyl(octa-4,6-dienyl)amino)ethanol, 2-octa-4,6-dienyloxyethanol and (methyl(octa-4,6-dienyl)amino)ethylamine. The reactants of formula (VIII) can be used individually or as a mixture.

The reactants of formula (VIII) can be obtained by processes including known processes of the telomerization of 1,3-butadiene. The term "telomerization" here denotes the reaction of compounds having conjugated double bonds in the presence of nucleophiles. The processes set out in publications WO 2004/002931, filed on Jun. 17, 2003 at the European Patent Office with the application number PCT/EP2003/006356, WO 03/031379, filed on Oct. 1, 2002 with the application number PCT/EP2002/10971, and WO 02/100803 filed on May 4, 2002 with the application number PCT/

EP2002/04909, especially the catalysts used for the reaction and the reaction conditions, such as pressure and temperature, for example, are incorporated for purposes of disclosure into the present specification.

The telomerization of 1,3-butadiene may take place preferably using metal compounds which comprise metals from groups 8 to 10 of the Periodic Table of the Elements as catalysts, it being possible with particular preference to use palladium compounds, more particularly palladium carbene complexes, which are set out in more detail in the publications set out above.

As a nucleophile it is possible in particular to use dialcohols, such as ethylene glycol, 1,2-propanediol and 1,3-propanediol; diamines, such as ethylenediamine, N-methyl-ethylenediamine, N,N'-dimethylethylenediamine or hexamethylenediamine; or aminoalkanols, such as aminoethanol, N-methylaminoethanol, N-ethylaminoethanol, aminopropanol, N-methylaminopropanol or N-ethylaminopropanol.

Where (meth)acrylic acid is the nucleophile used it is possible, for example, to obtain octadienyl(meth)acrylates which are particularly suitable as (meth)acrylic monomers having 8 to 40 carbon atoms.

The temperature at which the telomerization reaction is performed is between 10 and 180° C., preferably between 30 and 120° C., more preferably between 40 and 100° C. The reaction pressure is 1 to 300 bar, preferably 1 to 120 bar, more preferably 1 to 64 bar and very preferably 1 to 20 bar.

The preparation of isomers of compounds which have an octa-2,7-dienyl group can be carried out by isomerizing the double bonds present in the compounds with an octa-2,7-dienyl group.

The (meth)acrylic polymer for use in accordance with the invention comprises preferably 0.5% to 60%, more preferably 1% to 30%, very preferably 1.5% to 20% and with especial preference 2% to 15% by weight of units derived from (meth)acrylic monomers which in the alkyl radical have at least one double bond and 8 to 40 carbon atoms, based on the weight of the (meth)acrylic polymer.

The (meth)acrylic polymers may be obtained preferably by free-radical polymerization. Accordingly, the weight fraction of the respective units which contain these polymers is a product of the weight fractions of corresponding monomers that are used for preparing the polymers, since the weight fraction of groups derived from initiators or molecular weight regulators can usually be disregarded.

The above-recited (meth)acrylic monomers which in the alkyl radical have at least one double bond and 8 to 40 carbon atoms can be used individually or as a mixture of two or more monomers.

Besides the monomers set out above, a monomer mixture may comprise other monomers which are copolymerizable with them. These copolymerizable monomers include, among others, photoinitiator monomers, monomers with an acid group, monomers B comprising ester groups, which are different from the above-recited (meth)acrylic monomers and which in the alkyl radical have at least one double bond and 8 to 40 carbon atoms, and styrene monomers.

One group of preferred monomers for preparing (meth)acrylic polymers which can be used in accordance with the invention have an acid group. These monomers have been described above in connection with the polymeric photoinitiators, and so reference is made to that description.

The preferred monomers B comprising ester groups include, in particular, (meth)acrylates, fumarates, maleates and/or vinyl acetate.

The stated comonomers include, among others, (meth)acrylates having 1 to 10 carbon atoms in the alkyl radical and containing no double bonds or heteroatoms in the alkyl radical. These monomers have already been described in connection with the polymeric photoinitiators, and so reference is made to that description.

Surprising advantages are exhibited in particular by (meth)acrylic polymers which contain preferably 1% to to 99%, more preferably 10% to 70% and very preferably 20% to 60% by weight of units derived from (meth)acrylates having 1 to 10 carbon atoms in the alkyl radical that contain no double bonds or heteroatoms in the alkyl radical, based on the weight of the (meth)acrylic polymer.

Of particular interest in particular are (meth)acrylic polymers which contain 0% to 10%, preferably 0.5% to 8% and more preferably 1% to 5% by weight of units derived from monomers containing acid groups, based on the total weight of the (meth)acrylic polymer.

Further comonomers, especially (meth)acrylates having at least 11 carbon atoms in the alkyl radical, which derive from saturated alcohols and have no heteroatoms in the alkyl radical; heterocyclic(meth)acrylates; nitriles of (meth)acrylic acid and other nitrogen-containing methacrylates; aryl(meth)acrylates; (meth)acrylates having a hydroxyl group in the alkyl radical; polyalkoxylated derivatives of (meth)acrylic acid; glycerol carbonate methacrylate; 2-carbamoyloxyethyl methacrylate; (meth)acrylates which derive from saturated fatty acids or fatty acid amides; vinyl esters; styrene monomers; heterocyclic vinyl compounds; maleimide, methylmaleimide; vinyl ethers and isoprenyl ethers; and vinyl halides have been set out above, and so reference is made thereto.

In accordance with one particular modification of the present invention, the (meth)acrylic polymer may contain 0% to 60%, more preferably 5% to 50% and very preferably 10% to 40% by weight of units derived from styrene monomers, more particularly from styrene, substituted styrenes having an alkyl substituent in the side chain, substituted styrenes having an alkyl substituent on the ring and/or halogenated styrenes, based on the total weight of the (meth)acrylic polymer.

Preference is given, moreover, to monomer mixtures which have a very small fraction of (meth)acrylates that have two or more carbon-carbon double bonds whose reactivity is identical with that of a (meth)acrylate group. In one particular modification of the present invention the fraction of compounds having two or more (meth)acrylate groups is confined preferably to a maximum of 5% by weight, more particularly a maximum of 2% by weight, with particular preference a maximum of 1% by weight, with especial preference a maximum of 0.5% by weight, and with very particular preference a maximum of 0.1% by weight, based on the total weight of the monomers.

According to one particular aspect of the present invention the photoinitiator and the (meth)acrylic polymer may be joined to one another via a bond, and so the (meth)acrylic polymer has units derived from photoinitiator monomers.

It is possible, correspondingly, for a monomoer mixture for preparing (meth)acrylic polymers to comprise photoinitiator monomers. These monomers have been described above, and so reference is made to that description. Of particular interest in particular are (meth)acrylic polymers which have 0% to 10%, preferably 0.5% to 8% and more preferably 1% to 5% by weight of units derived from photoinitiator monomers based on the total weight of the (meth)acrylic polymer.

Monomer mixtures which comprise at least one (meth)acrylic monomer which in the alkyl radical has at least one carbon-carbon double bond and 8 to 40 carbon atoms, and at least one photoinitiator monomer, are novel and are therefore likewise provided by the invention. In this context it is possible in particular to use the above-recited (meth)acrylates having a keto group of the general formula (I).

In accordance with one particular embodiment of the present invention, the weight ratio of (meth)acrylic monomers which in the alkyl radical have at least one double bond and 8 to 40 carbon atoms to the photoinitiator monomers can preferably be in the range from 30:1 to 1:1, more preferably in the range from 20:1 to 5:1.

In a further aspect of the present invention the (meth) acrylic polymer may be prepared using monomers which exhibit an accelerating effect on the photoinitiation. These monomers include more particularly accelerant amines which have at least one ethylenically unsaturated double bond. These monomers include, among others, 2-dimethylaminoethyl methacrylate (DMAEMA) and dimethylaminopropyl methacrylat (DMAPMA).

Of particular interest are preferred monomer mixtures which comprise 0.5% to 60%, more preferably 1% to 30%, by weight of (meth)acrylate which in the alkyl radical has at least one double bond and 8 to 40 carbon atoms, 1% to 5%, more preferably 1.5% to 4%, by weight of photoinitiator monomer, 0% to 10%, especially 0.5% to 8%, by weight of monomer containing acid groups, and 5% to 98.9%, more preferably 10% to 70%, by weight of (meth)acrylate having 1 to 10 carbon atoms in the alkyl radical, based in each case on the weight of the monomers.

The molecular weight of (meth)acrylic polymers for use in accordance with the invention can be situated within a wide range. Generally speaking, the weight-average molecular weight is typically at least 1000 g/mol, preferably at least 2000 g/mol and very preferably at least 5000 g/mol. In accordance with one first aspect of the present invention, for example, (meth)acrylic polymers can be used which have a relatively high molecular weight. These (meth)acrylic polymers may be obtained in particular by emulsion polymerization, and their weight-average molecular weight may be, for example, in the range from 100 000 to 10 000 000 g/mol, more preferably in the range from 200 000 to 500 000 g/mol. Emulsion polymers are distinguished in particular by a high level of environmental compatibility, since they often require no organic solvents and can have a particularly low residual monomer content.

In accordance with a further aspect of the present invention it is also possible to use (meth)acrylic polymers having a low molecular weight. These (meth)acrylic polymers may have a weight-average molecular weight, for example, in the range from 1000 to 150 000 g/mol, more particularly 4000 to 100 000 g/mol, more preferably in the range from 5000 to 50 000 g/mol. Polymers having a low molecular weight are often used in coating compositions with organic solvents. Coating compositions which comprise organic solvents exhibit good processing properties over a wide temperature and humidity range. In relation to the performance capacity, coating compositions with these (meth)acrylic polymers display enhanced environmental compatibility. Hence extremely small amounts of organic solvents are released to the environment by evaporation, since the solvent content can be selected at a relatively low level for a predetermined set of processing properties.

Additionally of interest in particular are (meth)acrylic polymers which have a polydispersity index $M_w/M_n$ in the range from 1 to 5, more preferably in the range from 2 to 3. The molecular weight may be determined by means of gel permeation chromatography (GPC) against a PMMA standard.

The glass transition temperature of the polymer or polymers for use in accordance with the invention is preferably in the range from −60° C. to 100° C., more particularly −30° C. to 70° C., with particular preference in the range from −20 to 40° C., and very preferably in the range from 0 to 25° C. The glass transition temperature may be influenced by the nature and proportion of the monomers used in preparing the polymer. The glass transition temperature Tg of the polymer can be determined in a known manner by means of differential scanning calorimetry (DSC), more particularly in accordance with DIN EN ISO 11357. The glass transition temperature may be determined preferably as the mid-point of the glass stage of the second heating curve, with a heating rate of 10° C. per minute. Furthermore, the glass transition temperature Tg may also be calculated approximately in advance by means of the Fox equation. According to Fox T. G., Bull. Am. Physics. Soc. 1, 3, page 123 (1956) it holds that:

$$\frac{1}{Tg} = \frac{x_1}{Tg_1} + \frac{x_2}{Tg_2} + \ldots + \frac{x_n}{Tg_n}$$

where $x_n$ is the mass fraction (% by weight/100) of the monomer n and $Tg_n$ denotes the glass transition temperature in kelvins of the homopolymer of the monomer n. Further useful information can be found by the person skilled in the art in Polymer Handbook, $2^{nd}$ Edition, J. Wiley & Sons, New York (1975), which gives Tg values for the most common homopolymers. According to that handbook, for example, poly(methyl methacrylate) has a glass transition temperature of 378 K, poly(butyl methacrylate) one of 297 K, poly (isobornyl methacrylate) one of 383 K, poly(isobornyl acrylate) one of 367 K and poly(cyclohexyl methacrylate) one of 356 K. The polymer here may have one or more different glass transition temperatures. These figures therefore apply to a segment obtainable by polymerizing a mixture comprising at least one (meth)acrylic monomer which in the alkyl radical has at least one double bond and 8 to 40 carbon atoms, preferably a monomer mixture according to the invention. If a polymeric photoinitiator is used, then preferred glass transition temperatures are likewise situated within the ranges set out above.

For many applications and properties, the architecture of the (meth)acrylic polymer and/or of the polymeric photoinitiator is not critical. Accordingly the polymers, especially the emulsion polymers, may represent random copolymers, gradient copolymers, block copolymers and/or graft copolymers. Block copolymers and gradient copolymers can be obtained, for example, by altering the monomer composition discontinuously in the course of chain propagation. In one preferred aspect of the present invention the emulsion polymer, more particularly the (meth)acrylic polymer, is a random copolymer, in which the monomer composition is substantially constant over the polymerization. Since, however, the monomers may have different copolymerization parameters, the precise composition over the polymer chain of the polymer may vary.

The polymer may represent a homogeneous polymer which in an aqueous dispersion, for example, forms particles having a consistent composition. In that case the polymer, which is preferably an emulsion polymer, may be composed of one or more segments obtainable by polymerizing a monomer mixture.

According to another embodiment the polymer may be a core-shell polymer, which may have one, two, three or more shells. The shell may be connected via covalent bonds to the core or to the inner shells. Moreover, the shell may also be polymerized onto the core or an inner shell.

The outermost shell of emulsion polymers whose use is preferred may comprise preferably 5% to 50%, more preferably 15% to 28%, by weight of units derived from (meth)acrylic monomers which in the alkyl radical have at least one double bond and 8 to 40 carbon atoms, based on the weight of the outermost shell. In accordance with another aspect, a polymeric photoinitiator having a core-shell construction may be used whose outermost shell comprises 0% to 15%, more preferably 1% to 7%, by weight of units derived from photoinitiator monomers, based on the weight of the outermost shell.

The iodine number of (meth)acrylic polymers whose use is preferred is situated preferably in the range from 1 to 300 g iodine per 100 g polymer, preferably in the range from 2 to 250 g iodine per 100 g polymer, more preferably 5 to 100 g iodine per 100 g polymer and very preferably 10 to 50 g iodine per 100 g polymer, measured in accordance with DIN 53241-1.

Advantageously the (meth)acrylic polymer may have an acid number in the range from 0.1 to 40 mg KOH/g, preferably 1 to 20 mg KOH/g and very preferably in the range from 2 to 10 mg KOH/g. The acid number may be determined on the basis of a dispersion as well, in accorance with DIN EN ISO 2114. If a polymeric photoinitiator is used, it may preferably have an acid number which is within the ranges given above for the (meth)acrylic polymers.

The hydroxyl number of the (meth)acrylic polymer may be situated preferably in the range from 0 to 150 mg KOH/g, more preferably 20 to 120 mg KOH/g and very preferably in the range from 40 to 100 mg KOH/g. The hydroxyl number may be determined in accordance with DIN EN ISO 4629. In one particular aspect a polymeric photoinitiator may be used which has a hydroxyl number preferably in the range from 0 to 150 mg KOH/g, more preferably 20 to 120 mg KOH/g and very preferably in the range from 40 to 100 mg KOH/g.

The (meth)acrylic polymers and/or polymeric photoinitiators for use in accordance with the invention may be obtained in particular by solution polymerizations, bulk polymerizations or emulsion polymerizations, surprising advantages being achievable through a free-radical emulsion polymerization. These polymerizations are set out in Ullmanns's Encyclopedia of Industrial Chemistry, Sixth Edition.

Besides methods of conventional free-radical polymerization it is also possible to use related methods of controlled free-radical polymerization, such as, for example, ATRP (=atom transfer radical polymerization), NMP (nitroxide-mediated polymerization) or RAFT (=reversible addition fragmentation chain transfer) to prepare the polymers.

Methods of emulsion polymerization are set out in references including Ullmann's Encyclopedia of Industrial Chemistry, Fifth Edition. For that purpose, generally, an aqueous phase is prepared which as well as water may comprise customary additives, especially emulsifiers and protective colloids for stabilizing the emulsion.

Monomers are then added to this aqueous phase and are polymerized in the aqueous phase. When preparing homogeneous polymer particles, a monomer mixture may be added in batches or continuously over a time interval.

The emulsion polymerization may be performed, for example, as a miniemulsion or microemulsion, as set out in more detail in Chemistry and Technology of Emulsion Polymerisation, A. M. van Herk (editor), Blackwell Publishing, Oxford 2005 and J. O'Donnell, E. W. Kaler, Macromolecular Rapid Communications 2007, 28(14), 1445-1454. A miniemulsion is usually characterized by the use of costabilizers or swelling agents, and often long-chain alkanes or alkanols are used. The droplet size in miniemulsions is preferably in the range from 0.05 to 20 µm. The droplet size in microemulsions is preferably in the range below 1 µm, allowing particles to be obtained below a size of 50 nm. In the case of microemulsions it is common to use additional surfactants, examples being hexanol or similar compounds.

The dispersing of the monomer-containing phase in the aqueous phase may take place by known means. These include, in particular, mechanical techniques and also the application of ultrasound.

As well as homogeneous emulsion polymers it is also possible for core-shell polymers to be prepared. For that purpose the composition of the monomer mixture may be altered in steps, the polymerization preferably being carried out, before the composition is changed, to a conversion of at least 80% by weight, more preferably at least 95% by weight, based in each case on the total weight of the monomer mixture employed. A core-shell polymer here is a polymer prepared by a two-stage or multi-stage emulsion polymerization, without the core-shell structure having been shown by means, for example, of electron microscopy. Monitoring the progress of reaction of the polymerization in each step can be accomplished in a known way, as for example by gravimetry or gas chromatography.

The monomer composition for preparing the core comprises preferably 50% to 100% by weight of (meth)acrylates, a mixture of acrylates and methacrylates being used with particular preference. In one particular aspect of the present invention the weight ratio of acrylates to methacrylates in the core may be greater than or equal to 1, more preferably greater than or equal to 2. After the preparation of the core it is possible for a monomer mixture, preferably, to be grafted onto it or to be polymerized onto the core, this mixture comprising 0.5% to 60%, more preferably 2% to 30%, in particular 5% to 20% by weight of (meth)acrylic monomer which in the alkyl radical has at least one double bond and 8 to 40 carbon atoms.

The emulsion polymerization is carried out preferably at a temperature in the range from 0 to 120° C., more preferably in the range from 30 to 100° C. In this context, polymerization temperatures in the range of more than 60 to less than 90° C., advantageously in the range of more than 70 to less than 85° C., preferably in the range of greater than 75 to less than 85° C. have proved to be especially favourable.

The polymerization is initiated using the initiators customary for emulsion polymerization. Examples of suitable organic initiators are hydroperoxides, such as tert-butyl hydroperoxide or cumene hydroperoxide. Suitable inorganic initiators are hydrogen peroxide and also the alkali metal salts and ammonium salts of peroxodisulphuric acid, more particularly ammonium, sodium and potassium peroxodisulphate. Examples of suitable redox initiator systems are combinations of tertiary amines with peroxides or sodium disulphite and alkali metal salts and the ammonium salts of peroxodisulphuric acid, especially sodium and potassium peroxodisulphate. Further details can be found in the technical literature, especially H. Rauch-Puntigam, Th. Völker, "Acryl- and methacrylverbindungen", Springer, Heidelberg, 1967 or Kirk-Othmer, Encyclopedia of Chemical Technology, Vol. 1, pages 386ff., J. Wiley, New York, 1978. In the context of the present invention the use of organic and/or inorganic initiators is particularly preferred.

The stated initiators may be used either individually or in a mixture. They are employed preferably in an amount of 0.05 to 3.0% by weight, based on the total weight of the monomers of the respective stage. It is also possible with preference to carry out the polymerization using a mixture of different polymerization initiators with different half-lives, in order to maintain a constant flow of free radicals in the course of the polymerization and also at different polymerization temperatures.

The batch is stabilized preferably using emulsifiers and/or protective colloids. The emulsion is preferably stabilized by emulsifiers, in order to obtain a low dispersion viscosity. The total amount of emulsifier is preferably 0.1% to 15%, more particularly 1% to 10% and with particular preference 2% to 5%, by weight, based on the total weight of the monomers employed. In one particular aspect of the present invention a portion of the emulsifiers may be added during the polymerization.

Particularly suitable emulsifiers are anionic or nonionic emulsifiers or mixtures thereof, especially alkyl sulphates, preferably those having 8 to 18 carbon atoms in the alkyl radical, alkyl and alkylaryl ether sulphates having 8 to 18 carbon atoms in the alkyl radical and 1 to 50 ethylene oxide units;

sulphonates, preferably alkylsulphonates having 8 to 18 carbon atoms in the alkyl radical, alkylarylsulphonates having 8 to 18 carbon atoms in the alkyl radical, esters and half-esters of sulphosuccinic acid with monohydric alcohols or alkylphenols having 4 to 15 carbon atoms in the alkyl radical; if desired, these alcohols or alkylphenols may also be ethoxylated with 1 to 40 ethylene oxide units;

phosphoric acid partial esters and their alkali metal salts and ammonium salts, preferably alkyl and alkylarylphosphates having 8 to 20 carbon atoms in the alkyl or alkylaryl radical and 1 to 5 ethylene oxide units;

alkyl polyglycol ethers, preferably having 8 to 20 carbon atoms in the alkyl radical and 8 to 40 ethylene oxide units;

alkylaryl polyglycol ethers, preferably having 8 to 20 carbon atoms in the alkyl or alkylaryl radical and 8 to 40 ethylene oxide units;

ethylene oxide/propylene oxide copolymers, preferably block copolymers, favourably having 8 to 40 ethylene oxide and propylene oxide units.

The particularly preferred anionic emulsifiers include especially fatty alcohol ether sulphates, diisooctyl sulphosuccinate, lauryl sulphate, C15 paraffinsulphonate, these compounds being able to be used generally in the form of the alkali metal salt, more particularly in the form of the sodium salt. These compounds may be obtained commercially in particular under the trade names Disponil® FES 32, Aerosol® OT 75, Texapon® K1296 and Statexan® K1 from Cognis GmbH, Cytec Industries, Inc. and Bayer AG.

Advantageous nonionic emulsifiers include tert-octylphenol ethoxylate with 30 ethylene oxide units and fatty alcohol polyethylene glycol ethers which have preferably 8 to 20 carbon atoms in the alkyl radical and 8 to 40 ethylene oxide units. These emulsifiers are available commercially under the trade names Triton® X 305 (Fluka), Tergitol® 15-S-7 (Sigma-Aldrich Co.), Marlipal® 1618/25 (Sasol Germany) and Marlipal® O 13/400 (Sasol Germany).

With preference it is possible to use mixtures of anionic emulsifier and nonionic emulsifier. Advantageously the weight ratio of anionic emulsifier to nonionic emulsifier may be in the range from 20:1 to 1:20, preferably 2:1 to 1:10 and more preferably 1:1 to 1:5. Having been found especially appropriate in this context are mixtures which comprise a sulphate, more particularly a fatty alcohol ether sulphate, a lauryl sulphate, or a sulphonate, more particularly a diisooctyl sulphosuccinate or a paraffinsulphonate, as anionic emulsifier and comprising an alkylphenol ethoxylate or a fatty alcohol polyethylene glycol ether, in each case containing preferably 8 to 20 carbon atoms in the alkyl radical and 8 to 40 ethylene oxide units, as nonionic emulsifier.

Where appropriate, the emulsifiers can also be used in a mixture with protective colloids. Suitable protective colloids include partially hydrolysed polyvinyl acetates, polyvinylpyrrolidones, carboxymethyl-, methyl-, hydroxyethyl- and hydroxypropyl-cellulose, starches, proteins, poly(meth)acrylic acid, poly(meth)acrylamide, polyvinylsulphonic acids, melamine-formaldehydesulphonates, naphthalene-formaldehydesulphonates, styrene-maleic acid copolymers and vinyl ether-maleic acid copolymers. If protective colloids are used, their use is practised preferably in an amount of 0.01% to 1.0% by weight, based on the total amount of the monomers. The protective colloids may be introduced in the initial charge before the start of the polymerization, or metered in. The initiator may be included in the initial charge or metered in. It is also possible, moreover, to include some of the initiator in the initial charge and to meter in the remainder.

The polymerization is started preferably by heating of the batch to the polymerization temperature and inclusion of the initiator in the initial charge and/or metered addition thereof, preferably in aqueous solution. Some of the monomers may be included in the initial charge to the reactor, with the remainder metered in over a defined period of time. Generally speaking it is advantageous to polymerize the portion of the monomers that has been included in the initial charge to the reactor and only then to begin the feed. As an alternative to the inclusion of a defined amount of monomer in the initial charge, the feed may be interrupted for a number of minutes once, for example, 1%-5% of the monomers have been metered in. The metered additions of emulsifier and monomers may be carried out separately or preferably in the form of a mixture, more particularly in the form of an emulsion in water.

The emulsion polymerization can be carried out within a broad pH range. The pH is preferably between 2 and 9. In one particular embodiment the polymerization is carried out at pH levels of between 4 and 8, more particularly between 6 and 8. It is also possible to adjust the dispersion to a pH range preferred for the application, after polymerization has taken place. For pigmented coating systems the range is generally 8-9 or above.

Within wide limits, the molecular weight of the polymers is initially not critical. Where particularly hard and solvent-resistant coating materials with good mechanical properties are desired, a very high molecular weight may be useful. Preferred emulsion polymers with a high fraction of polymers which are insoluble in THF may be obtained in the manner described above. The reaction parameters to obtain a high molecular weight are known. In that case, for instance, and in particular, it is possible to forego the use of molecular weight regulators.

Coating materials with particularly good and easy processing may also contain polymers having a lower molecular weight, the solvent resistance and the hardness of these coatings attaining a relatively high level. These polymers with particularly good processing properties may preferably have a molecular weight below 1 000 000 g/mol, preferably below 500 000 g/mol and more preferably below 250 000 g/mol. The molecular weight may be determined by means of gel permeation chromatography (GPC) against a PMMA standard.

Polymers, more particularly emulsion polymers, having a low molecular weight may be obtained by the addition of molecular weight regulators to the reaction mixture before or during the polymerization. For this purpose it is possible to use sulphur-free molecular weight regulators and/or sulphur-containing molecular weight regulators.

Without any intention to impose a restriction, the sulphur-free molecular weight regulators include, for example, dimeric α-methylstyrene (2,4-diphenyl-4-methyl-1-pentene), enol ethers of aliphatic and/or cycloaliphatic aldehydes, terpenes, β-terpinene, terpinolene, 1,4-cyclohexadiene, 1,4-dihydronaphthalene, 1,4,5,8-tetrahydronaphthalene, 2,5-dihydrofuran, 2,5-dimethylfuran and/or 3,6-dihydro-2H-pyran; dimeric α-methylstyrene is preferred.

Sulphur-containing molecular weight regulators which can be used are preferably mercapto compounds, dialkyl sulphides, dialkyl disulphides and/or diaryl sulphides. The following polymerization regulators are exemplified: di-n-butyl sulphide, di-n-octyl sulphide, diphenyl sulphide, thiodiglycol, ethylthioethanol, diisopropyl disulphide, di-n-butyl disulphide, di-n-hexyl disulphide, diacetyl disulphide, diethanol sulphide, di-t-butyl trisulphide and dimethyl sulphoxide. Preferred compounds used as molecular weight regulators are mercapto compounds, dialkyl sulphides, dialkyl disulphides and/or diaryl sulphides. Examples of these compounds are ethyl thioglycolate, 2-ethylhexyl thioglycolate, cysteine, 2-mercaptoethanol, 3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea and alkyl mercaptans such as n-butyl mercaptan, n-hexyl mercaptan or n-dodecyl mercaptan. Polymerization regulators used with particular preference are mercaptoalcohols and mercaptocarboxylic acids.

The molecular weight regulators are used preferably in amounts of 0.05% to 10%, more preferably 0.1% to 5%, by weight, based on the monomers used in the polymerization. In the polymerization it is of course also possible to employ mixtures of polymerization regulators.

It is additionally possible to use polymerizations employing molecular weight regulators in order to reduce the minimum film-forming temperature (MFFT) of the polymers obtainable thereby. In accordance with this preferred embodiment, the fraction of molecular weight regulators may be calculated such that the (meth)acrylic polymers or the coating materials of the invention have a minimum film-forming temperature (MFFT) of not more than 60° C., more preferably not more than 50° C. and very preferably not more than 40° C., a temperature which can be measured in accordance with DIN ISO 2115. The higher the fraction of molecular weight regulator, the lower the minimum film-forming temperature. If polymeric photoinitiators with a high molecular weight are used, the minimum film-forming temperature thereof may be situated preferably within the ranges specified above.

The setting of the particle radii can be influenced by factors including the fraction of emulsifiers. The higher this fraction, especially at the beginning of the polymerization, the smaller the particles obtained.

The emulsion polymer, more particularly the (meth)acrylic polymer, preferably has no crosslinking or such a slight degree of crosslinking that the fraction which is soluble in tetrahydrofuran (THF) at 20° C. is more than 60% by weight, based on the weight of the emulsion polymer. In a further, preferred embodiment, the emulsion polymer may have a 20° C. THF-soluble fraction of 2% to 60%, more preferably 10% to 50% and very preferably 20% to 40% by weight, based on the weight of the emulsion polymer. The soluble fraction is determined by storing a sample of the polymer, dried in the absence of oxygen, in 200 times the amount of solvent, based on the weight of the sample, at 20° C. for 4 hours. To ensure the absence of oxygen, the sample, for example, may be dried under nitrogen or under reduced pressure. Thereafter the solution is separated from the insoluble fraction, by filtration for example. After the solvent has evaporated, the weight of the residue is ascertained. For example, a 0.5 g sample of an emulsion polymer dried under reduced pressure may be stored in 150 ml of THF for 4 hours.

The particle radius of the emulsion polymers may lie within a wide range. Hence it is possible in particular to use emulsion polymers having a particle radius in the range from 10 to 500 nm, preferably 10 to 100 nm, more preferably 20 to 60 nm. Particle radii below 50 nm in particular may be advantageous for film formation and for the coating properties. The radius of the particles can be determined by means of PCS (photon correlation spectroscopy), with the reported data relating to the r50 value (50% of the particles are smaller, 50% are larger). For this purpose it is possible to make use, for example, of a Beckman Coulter N5 Submicron Particle Size Analyzer.

Surprising advantages are displayed in particular by emulsion polymers having a high swelling factor. Preferred emulsion polymers, more particularly (meth)acrylic polymers, exhibit a swelling factor of at least 2, more particularly at least 4, more preferably at least 6 and very preferably at least 8. The swelling factor is determined by first measuring the particle radius of the emulsion polymers in water ($r_{water}$) with the method outlined above. Thereafter the emulsion polymers are swollen in a solvent/water mixture (THF/water=90:10) and the particle size (microgels) is quantified by measurement with the Coulter Nanosizer N5 ($r_{solv.}$). Customarily for this purpose a corresponding amount of tetrahydrofuran (THF) is added to set a volume ratio of THF/water=90:10 in the dispersion. Measurement takes place at 20° C., the dispersion being swollen for 5 minutes after the addition of the solvent (THF). The quotient formed from the particle volumes calculated from the resulting particle radii ($r_{solv.}$ und $r_{water}$) is defined as the swelling factor (SF):

$$SF = \frac{r_{solv.}^3}{r_{water}^3}$$

High swelling factors are displayed in particular by emulsion polymers which exhibit a low level of crosslinking. Correspondingly, emulsion polymers obtained from a monomer mixture having a low fraction of compounds containing two or more (meth)acrylate groups, in particular, exhibit a high swelling factor.

Of particular interest in particular are coating materials which comprise preferably 40% to 80%, more preferably 50% to 75%, by weight of at least one (meth)acrylic polymer having units derived from (meth)acrylic monomers which in the alkyl radical have at least one double bond and 8 to 40 carbon atoms.

The coating materials of the invention do not require siccatives, although such additives may be included as an optional constituent in the compositions. They include more particularly organometallic compounds, examples being metal soaps of transition metals, such as cobalt, manganese, vanadium, lead, zirconium, for example; alkali metals or alkaline earth metals, such as lithium, potassium and calcium, for example. Examples that may be mentioned include cobalt naphthalate and cobalt acetate. The siccatives can be used individually or as a mixture, particular preference being given in particular to mixtures which comprise cobalt salts, zirconium salts and lithium salts.

The fraction of siccatives in preferred coating materials may be situated preferably in the range from greater than 0% to 5% by weight, more preferably in the range from 1% to 3% by weight, based on the polymer content.

In accordance with one particular aspect of the present invention, an accelerant amine may be used. These compounds have been described before and are set out in references including WO 2003/091287, filed on Apr. 17, 2003 at the European Patent Office with the application number PCT/EP03/04035, and accordingly this publication, especially the accelerators it describes, are incorporated for purposes of disclosure into the present specification.

The preferred accelerant amines include low molecular weight amines, polymeric amines and polymerizable amines.

Particularly advantageous is the joint use with NDEA (N-methyldiethanolamine) or else with DMAEMA (2-diethylaminoethyl methacrylate).

In one particular aspect of the present invention the coating materials may comprise solvents. These coating materials may be processed over a particularly broad temperature and humidity range. The concept of the solvent should be understood widely here. The preferred solvents include, in particular, aromatic hydrocarbons, such as toluene, xylene; esters, especially acetates, preferably butyl acetate, ethyl acetate, propyl acetate; ketones, preferably ethyl methyl ketone, acetone, methyl isobutyl ketone or cyclohexanone; alcohols, especially isopropanol, n-butanol, isobutanol; ethers, especially glycol monomethyl ether, glycol monoethyl ether, glycol monobutyl ether; aliphatics, preferably pentane, hexane, cycloalkanes and substituted cycloalkanes, such as cyclohexane; mixtures of aliphatics and/or aromatics, preferably naphtha; benzine, biodiesel; but also plasticizers such as low molecular weight polypropylene glycols or phthalates. The fraction of solvent in preferred coating materials may lie in particular in the range from 0% to 50%, more preferably in the range from 1% to 20%, by weight.

Surprisingly good processing properties are displayed, furthermore, by coating compositions whose solids content is preferably at least 50% and more preferably at least 60% by weight. These figures apply in particular to coating compositions which comprise organic solvents.

In another embodiment the coating compositions of the invention include a relatively high proportion of water, with aqueous dispersions representing particularly preferred coating compositions. The aqueous dispersions preferably have a solids content in the range from 10% to 70%, more preferably 20% to 60%, by weight. These coating compositions frequently comprise only a very small proportion, and preferably none, of organic solvents. Preferred aqueous dispersions contain not more than 5%, more preferably not more than 2% by weight, of volatile organic constituents (VOCs), such as residual monomers or organic solvents. These coating compositions, accordingly, are distinguished by a particularly high level of environment-friendliness.

Furthermore, the coating materials of the invention may comprise customary additives, especially UV stabilizers, flow control assistants and biocides.

The dynamic viscosity of the coating material is dependent on the solids content and can span a broad range. Hence in the case of a high polymer content it may amount to more than 10 000 mPas. Usually advantageous is a dynamic viscosity in the range from 10 to 4000 mPas, preferably 10 to 1000 mPas and very preferably 10 to 500 mPas, measured in accordance with DIN EN ISO 2555 at 25° C. (Brookfield).

The present invention further provides a process for producing a coating, in which a coating material of the invention is applied to a substrate and cured.

The coating composition of the invention can be applied by customary application techniques, more particularly by roll application or spraying methods. Also suitable, furthermore, are dipping methods for applying the coating composition. The coating composition is cured by drying and oxidative crosslinking by means of atmospheric oxygen.

In one preferred process the coating composition applied to the substrate may be additionally cured by exposure to light having a wavelength in the range from 100 to 800 nm, preferably 200 to 800 nm and more preferably 350 to 780 nm, the luminous intensity being preferably in the range from 0.1 to 100 mW/cm$^2$, more preferably in the range from 0.5 to 80 mW/cm$^2$, as measured in accordance with DIN 5050-1 1992-05. Exposure here may take place with natural light. In one preferred embodiment the exposure may take place with a commercially available unit. Such units are traded, for example, by Cetelon-Nanotechnik under the name LUMI-FORM®.

The present coating composition may be used in particular for preparing paints, varnishes, sealants, adhesives and printing inks.

The substrates which can preferably be provided with a coating material of the invention include, in particular, wood, metals, especially iron and steel, and also plastics.

The present invention additionally provides coated articles obtainable by a process according to the invention. The coating of these articles is distinguished by an outstanding spectrum of properties.

The coatings obtainable from the coating materials of the invention exhibit high solvent resistance, and in particular only small fractions are dissolved from the coating by solvent. Preferred coatings are highly resistant to methyl isobutyl ketone (MIBK) in particular. Hence the weight loss after treatment with MIBK is preferably not more than 50%, more preferably not more than 35%, by weight. The absorption of MIBK is preferably not more than 1000% by weight, more preferably not more than 600% by weight, based on the weight of the coating employed. These values are measured at a temperature of approximately 25° C. over an exposure time of at least 4 hours, the coating measured being a fully dried coating which has been crosslinked.

The coatings obtained from the coating materials of the invention display high mechanical resistance. The pendulum hardness is preferably at least 15 s, more preferably at least 25 s, as measured in accordance with DIN ISO 1522.

Furthermore, preferred coatings obtainable from the coating materials of the invention are notable for surprisingly firm adhesion, as determinable in particular by the cross-cut experiment. Hence it is possible in accordance with the standard DIN EN ISO 2409 to achieve a classification of 0-1 in particular, more preferably of 0.

The intention of the text below is to illustrate the present invention with reference to inventive and comparative examples, without thereby imposing any restriction.

Preparation of 4-hydroxybenzophenone*13EO Methacrylate by Transesterification under LiCl/Ca(OH)$_2$ Catalysis 700 g of 4-hydroxybenzophenone*13EO (PE 5442 from BASF) and 713 g of MMA were weighed out, the mixture was heated to 120° C. with stirring and air introduction, and water was removed by distillative removal of around 100 ml of MMA. The mixture was then cooled, 0.3 g of LiCl and 1.4 g of Ca(OH)$_2$ as catalyst, and the amount corresponding to the MMA removed by distillation, were added, and heating was again carried out at 120° C. for 4 hours. In the course of this heating, methanol was removed by distillation. After this time, the mixture was cooled with stirring (to around 80° C.), 6.8 g of Tonsil L80FF (Süd-Chemie) were added, and the mixture was cooled to room tempertue with stirring. The batch was then filtered through a Seitz T1000 pressure filter (Ø 14 cm; 1 bar, filtration time approximately 45 minutes). This was followed by concentration under reduced pressure on a rotary evaporator.

Preparation of 4-methacryloyloxybenzophenone from Methacrylic Anhydride and 4-hydroxybenzophenone A 4 l four-necked round-bottomed flask with KPG stirring, reflux condenser, temperature sensor, air introduction, Anschütz attachment, dropping funnel and oil bath was charged with 695.9 g of 4-hydroxybenzophenone, 618.4 g of methacrylic anhydride and 1.99 g (1.08 ml) of concentrated $H_2SO_4$ and this initial charge was then heated to 90° C. with stirring. The reaction time at 90° C. was around 6 hours. It was then cooled to 60° C. and admixed with 1.8 g of NaOH in solution in 10 g of water, to neutralize the $H_2SO_4$, and with 22.4 g of methanol for the hydrolysis of methacrylic anhydride. Subsequently it was stirred at 60° C. for 1 hour, and then poured with stirring (metal paddle stirrer, stirring motor), in a thin jet, into 3 l of water. Stirring was carried out for ½ an hour and the precipitate was then filtered on a glass filter frit, rinsed with twice 2 l of $H_2O$ (in each case stirred for approximately 15 minutes in a glass beaker using a stirring motor with metal paddle stirrer) and then sucked dry on the suction filter. The solid was subsequently dried in air for 5 days.

Preparation of a Mixture of Methacryloyloxy-2-ethyl-fatty Acid Amides

A four-necked round-bottomed flask equipped with a sabre stirrer with stirring sleeve and stirring motor, nitrogen inlet, liquid-phase thermometer and distillation bridge was charged with 206.3 g (0.70 mol) of fatty acid methyl ester mixture, 42.8 g (0.70 mol) of ethanolamine and 0.27 g (0.26%) of LiOH. The fatty acid methyl ester mixture contained 6% by weight of saturated C12 to C16 fatty acid methyl esters, 2.5% by weight of saturated C17 to C20 fatty acid methyl esters, 52% by weight of monounsaturated C18 fatty acid methyl esters, 1.5% by weight of monounsaturated C20 to C24 fatty acid methyl esters, 36% by weight of polyunsaturated C18 fatty acid methyl esters and 2% by weight of polyunsaturated C20 to C24 fatty acid methyl esters.

The reaction mixture was heated to 150° C. Over the course of 2 hours, 19.5 ml of methanol were removed by distillation. The resulting reaction product contained 86.5% of fatty acid ethanolamides. The resulting reaction mixture was processed further without purification.

After cooling had taken place, 1919 g (19.2 mol) of methyl methacrylate, 3.1 g of LiOH and an inhibitor mixture consisting of 500 ppm of hydroquinone monomethyl ether and 500 ppm of phenothiazine were added.

With stirring the reaction apparatus was flushed with nitrogen for 10 minutes. Thereafter the reaction mixture was heated to boiling. The methyl methacrylate/methanol azeotrope was separated off and then the overhead temperature was raised in stages to 100° C. After the end of the reaction, the reaction mixture was cooled to around 70° C. and filtered.

Excess methyl methacrylate was separated off on a rotary evaporator. This gave 370 g of product.

EXAMPLE 1

Preparation of a Dispersion with 1.50% by Weight of 4-methacryloyloxybenzophenone and 15% by Weight of Methacryloyloxy-2-ethyl-fatty Acid Amide by the Feed Method BA-co-MMA-methacryloyloxy-2-ethyl-fatty Acid Amide-4-methacryloyloxybenzophenone-methacrylic Acid=45-37.5-15-1.5-1

First of all in a 2 l PE beaker 180 g of butyl acrylate (BA), 150 g of methyl methacrylate (MMA), 60 g of methacryloyloxy-2-ethyl-fatty acid amide mixture, 4 g of methacrylic acid (MAA), 6.81 g of 4-methacryloyloxybenzophenone, 1.2 g of ammonium peroxodisulphate (APS), 12.0 g of Disponil FES 32 (30% form) and 359.03 g of water were emulsified using an Ultra-Turrax at 4000 rpm for 3 minutes.

A 1 l Rettberg reactor heatable by means of a waterbath and equipped with a metal-bladed paddle stirrer was charged with 230 g of water and 0.3 g of Disponil FES 32 (30% form) and this initial charge was heated to 80° C. and admixed with a solution of 0.3 g of ammonium peroxodisulphate (APS) in 10 g of water. 5 minutes after the addition of the APS, the emulsion prepared above was metered in over the course of 240 minutes (program: 3 minutes' feed, 4 minutes' wait, 237 minutes' feed of remainder). The stirring speed was 120 rpm.

After the end of the feed, stirring was continued at 80° C. for one hour. Thereafter the dispersion was cooled to room temperature and filtered through a VA sieve with a mesh size of 0.09 mm.

The particle radius was determined by PCS (photon correlation spectroscopy), the data reported relating to the r50 value (50% of the particles are smaller, 50% are larger). For this purpose a Beckman Coulter N5 Submicron Particle Size Analyzer was used.

The emulsion prepared had a solids content of 40±1%, a pH of 5.8, a viscosity of 11 mPas and an $r_{N5}$ value of 64 nm.

The coating material was adjusted to a pH of approximately 9 using an $NH_3$ solution and additized with a siccative (2.5% Nuodex Web Combi AQ).

The properties of the resulting coating material were investigated in tests of the solvent resistance. For the production of dispersion films with a thickness of 0.5 mm, the calculated amounts of dispersion (via area and solids content) were poured onto the corresponding glass plates, which were exposed for 7 days on a window sill or beneath a UV lamp. The films for UV exposure were subjected to preliminary drying in the dark overnight.

For UV illumination an instrument with 2 UV lamps (TL2OW/05 (Philips) $\lambda_{max}$=370 nm and an output of 0.9 mW/cm$^2$) was used. The distance between lamp and dispersion film was approximately 5.5 cm.

The solvent resistance was determined using methyl isobutyl ketone (MIBK), with a sample being swollen with MIBK at room temperature for 4 hours. Thereafter the sample was taken from the solvent, and excess solvent was removed.

Subsequently the sample was dried at approximately 140° C. for 1 hour. The values set out in Table 1 relate to the weight of the coating after treatment with MIBK, also referred to herein as "true swelling".

The results obtained are set out in Table 1.

EXAMPLE 2

Preparation of a Dispersion with 3.0% by Weight of 4-methacryloyloxybenzophenone and 15% by Weight of Methacryloyloxy-2-ethyl-fatty Acid Amide by the Feed Method BA-co-MMA-methacryloyloxy-2-ethyl-fatty Acid Amide-4-methacryloyloxybenzophenone-methacrylic Acid=45-36-15-3-1

First of all in a 2 l PE beaker 180 g of butyl acrylate (BA), 144 g of methyl methacrylate (MMA), 60 g of methacryloyloxy-2-ethyl-fatty acid amide mixture, 4 g of methacrylic acid (MAA), 13.62 g of 4-methacryloyloxybenzophenone, 1.2 g of ammonium peroxodisulphate (APS), 12.0 g of Disponil FES 32 (30% form) and 358.89 g of water were emulsified using an Ultra-Turrax at 4000 rpm for 3 minutes.

A 1 l Rettberg reactor heatable by means of a waterbath and equipped with a metal-bladed paddle stirrer was charged with 230 g of water and 0.3 g of Disponil FES 32 (30% form) and this initial charge was heated to 80° C. and admixed with a solution of 0.3 g of ammonium peroxodisulphate (APS) in 10 g of water. 5 minutes after the addition of the APS, the emulsion prepared above was metered in over the course of 240 minutes (program: 3 minutes' feed, 4 minutes' wait, 237 minutes' feed of remainder). The stirring speed was 120 rpm.

After the end of the feed, stirring was continued at 80° C. for one hour. Thereafter the dispersion was cooled to room temperature and filtered through a VA sieve with a mesh size of 0.09 mm.

The emulsion prepared had a solids content of 40±1%, a pH of 6.0, a viscosity of 12 mPas and an $r_{N5}$ value of 67 nm.

The coating material was adjusted to a pH of approximately 9 using an $NH_3$ solution and additized with a siccative (2.5% Nuodex Web Combi AQ).

The properties of the resultant coating material were investigated in the solvent resistance tests described in Example 1. The results obtained are set out in Table 1.

COMPARATIVE EXAMPLE 1

Preparation of a Dispersion with 15% by Weight of Methacryloyloxy-2-ethyl-fatty Acid Amide by the Feed Method BA-co-MMA-methacryloyloxy-2-ethyl-fatty Acid Amide-methacrylic Acid=45-39-15-1

First of all in a 2 l PE beaker 180 g of butyl acrylate (BA), 156 g of methyl methacrylate (MMA), 60 g of methacryloyloxy-2-ethyl-fatty acid amide mixture, 4 g of methacrylic acid (MAA), 1.2 g of ammonium peroxodisulphate (APS), 12.0 g of Disponil FES 32 (30% form) and 359.18 g of water were emulsified using an Ultra-Turrax at 4000 rpm for 3 minutes.

A 2 l glass reactor heatable by means of a waterbath and equipped with a paddle stirrer was charged with 230 g of water and 0.3 g of Disponil FES 32 (30% form) and this initial charge was heated to 80° C. and admixed with a solution of 0.3 g of ammonium peroxodisulphate (APS) in 10 g of water. 5 minutes after the addition of the APS, the emulsion prepared above was metered in over the course of 240 minutes (program: 3 minutes' feed, 4 minutes' wait, 237 minutes' feed of remainder).

After the end of the feed, stirring was continued at 80° C. for one hour. Thereafter the dispersion was cooled to room temperature and filtered through a VA sieve with a mesh size of 0.09 mm.

The emulsion prepared had a solids content of 40±1%, a pH of 5.6, a viscosity of 22 mPas and an $r_{N5}$ value of 70 nm.

The coating material was adjusted to a pH of approximately 9 using an $NH_3$ solution and additized with a siccative (2.5% Nuodex Web Combi AQ).

The properties of the resultant coating material were investigated in the solvent resistance tests described in Example 1. The results obtained are set out in Table 1.

COMPARATIVE EXAMPLE 2

Preparation of a Dispersion with 1.58% by weight of 4-methacryloyloxybenzophenone by the Feed Method BA-co-MMA-methacryloyloxybenzophenone-methacrylic Acid=48.42-49-1.58-1

First of all in a 2 l PE beaker 242.1 g of butyl acrylate (BA), 245.0 g of methyl methacrylate (MMA), 8.97 g of methacryloyloxybenzophenone, 5 g of methacrylic acid (MAA), 0.9 g of ammonium peroxodisulphate (APS), 3.33 g of Disponil FES 32 (30% form) and 305.71 g of water were emulsified using an Ultra-Turrax at 4000 rpm for 3 minutes.

A glass reactor heatable by means of a waterbath and equipped with a paddle stirrer was charged with 190 g of water and 0.42 g of Disponil FES 32 (30% form) and this initial charge was heated to 80° C. and admixed with a solution of 0.1 g of ammonium peroxodisulphate (APS) in 10 g of water. 5 minutes after the addition of the APS, the emulsion prepared above was metered in over the course of 240 minutes (program: 3 minutes' feed, 4 minutes' wait, 237 minutes' feed of remainder).

After the end of the feed, stirring was continued at 80° C. for one hour. Thereafter the dispersion was cooled to room temperature and filtered through a VA sieve with a mesh size of 0.09 mm.

The emulsion prepared had a solids content of 50±1%, a pH of 9.3 (after adjustment using an $NH_3$ solution), a viscosity of 90 mPas and an $r_{N5}$ value of 74 nm.

The properties of the resultant coating material were investigated in the solvent resistance tests described in Example 1. The results obtained are set out in Table 1.

COMPARATIVE EXAMPLE 3

Preparation of a Dispersion with 3.17% by Weight of 4-methacryloyloxybenzophenone by the Feed Method BA-co-MMA-methacryloyloxybenzophenone-methacrylic Acid=46.83-49-3.17-1

First of all in a PE beaker 234.15 g of butyl acrylate (BA), 245.0 g of methyl methacrylate (MMA), 18.0 g of 4-methacryloyloxybenzophenone, 5 g of methacrylic acid (MAA), 0.9 g of ammonium peroxodisulphate (APS), 3.33 g of Disponil FES 32 (30% form) and 305.34 g of water were emulsified using an Ultra-Turrax at 4000 rpm for 3 minutes.

A glass reactor heatable by means of a waterbath and equipped with a paddle stirrer was charged with 190 g of water and 0.42 g of Disponil FES 32 (30% form) and this initial charge was heated to 80° C. and admixed with a solution of 0.1 g of ammonium peroxodisulphate (APS) in 10 g of water. 5 minutes after the addition of the APS, the emulsion prepared above was metered in over the course of 240 minutes (program: 3 minutes' feed, 4 minutes' wait, 237 minutes' feed of remainder).

After the end of the feed, stirring was continued at 80° C. for one hour. Thereafter the dispersion was cooled to room temperature and filtered through a VA sieve with a mesh size of 0.09 mm.

The emulsion prepared had a solids content of 50±1%, a pH of 9.2 (after adjustment using an $NH_3$ solution), a viscosity of 103.5 mPas and an $r_{N5}$ value of 70 nm.

The properties of the resultant coating material were investigated in the solvent resistance tests described in Example 1. The results obtained are set out in Table 1.

COMPARATIVE EXAMPLE 4

Preparation of a Dispersion with 3.0% by Weight of Benzophenone Methacrylate by the Feed Method BA-co-MMA-benzophenoneMA-methacrylic Acid=57-39-3-1

First of all in a PE beaker 570 g of butyl acrylate (BA), 390.0 g of methyl methacrylate (MMA), 34.06 g of 4-methacryloyloxybenzophenone, 10 g of methacrylic acid (MAA), 3.0 g of ammonium peroxodisulphate (APS), 6.67 g of Disponil FES 32 (30% form) and 615.23 g of water were emulsified using an Ultra-Turrax at 4000 rpm for 3 minutes.

A 2 l Rettberg reactor heatable by means of a waterbath and equipped with a metal paddle stirrer was charged with 390 g of water and 0.833 g of Disponil FES 32 (30% form) and this initial charge was heated to 80° C. and admixed with a solution of 0.75 g of ammonium peroxodisulphate (APS) in 10 g of water. 5 minutes after the addition of the APS, the emulsion prepared above was metered in over the course of 240 minutes (program: 3 minutes' feed, 4 minutes' wait, 237 minutes' feed of remainder).

After the end of the feed, stirring was continued at 80° C. for one hour. Thereafter the dispersion was cooled to room temperature and filtered through a VA sieve with a mesh size of 0.09 mm.

The emulsion prepared had a solids content of 50±1%, a pH of 7.65, a viscosity of 125 mPas and an $r_{N5}$ value of 67 nm.

The properties of the resultant coating material were investigated in the solvent resistance tests described in Example 1, the coating material having been adjusted beforehand to a pH of approximately 9 using an $NH_3$ solution. The results obtained are set out in Table 1.

TABLE 1

Properties of the coatings

|  | Example 1 | Example 2 | Comp. ex. 1 | Comp. ex. 2 | Comp. ex. 3 | Comp. ex. 4 |
|---|---|---|---|---|---|---|
| MIBK-absorption [%] | 170 | 138 | 269 | 258 | 254 | 212 |
| True swelling [%] | 186 | 148 | 307 | 273 | 263 | 223 |

The results demonstrate, surprisingly, that a combination of photoinitiators with polymers comprising units having unsaturated groups allows a distinct improvement to be achieved in the solvent resistance. This is evident in particular from the surprisingly high decrease in MIBK absorption. For instance, by doubling the photoinitiator content, it is possible to achieve a decrease in swelling from 170% to 138%. In other words, the decrease is approximately 18.8% ((170−138)/170*100%). Without the presence of units having unsaturated groups, the improvement achievable from doubling the photoinitiator content is only about 1.5% ((258−254)/254*100%).

COMPARATIVE EXAMPLE 5

Preparation of a Dispersion with 15.0% by Weight of Methacryloyloxy-2-hydroxypropyl-linoleic Ester by the Feed Method with Additional Stabilization BA-co-MMA-methacryloyloxy-2-hydroxypropyl-linoleic Ester-methacrylic Acid=45-39-15-1

First of all in a 2 l PE beaker 382.50 g of butyl acrylate (BA), 331.50 g of methyl methacrylate (MMA), 146.53 g of methacryloyloxy-2-hydroxypropyl-linoleic ester mixture, 8.50 g of methacrylic acid (MAA), 2.55 g of ammonium peroxodisulphate (APS), 5.67 g of Disponil FES 32 (30% form) and 540.84 g of water were emulsified using an Ultra-Turrax at 4000 rpm for 4 minutes. The methyacryloyloxy-2-hydroxy-propyl-linoleic ester was obtained by reacting linoleic acid with glycidyl methacrylate.

A 2 l Rettberg reactor heatable by means of a waterbath and equipped with a paddle stirrer was charged with 330 g of water and 0.708 g of Disponil FES 32 (30% form) and this initial charge was heated to 80° C. and admixed with a solution of 0.638 g of ammonium peroxodisulphate (APS) in 10 g of water. 5 minutes after the addition of the APS, the emulsion prepared above was metered in over the course of 240 minutes (program: 3 minutes' feed, 4 minutes' wait, 237 minutes' feed of remainder).

After the end of the feed, stirring was continued at 80° C. for 1 hour. Thereafter the dispersion was cooled to 50° C. and admixed with 25% strength ammonia (0.055% by weight, based on the water content). Then 3% by weight of Triton X305, based on the water content, were added. The emulsion was then cooled to room temperature and admixed with 25% strength ammonia solution (0.145% by weight, based on the water content). Following the addition of ammonia, the dispersion was filtered through a fabric sieve with a mesh size of 125 μm.

The emulsion prepared had a solids content of 49±1%, a pH of 9.1, a viscosity of 289 mPas and a particle radius of 63 nm.

The coating material was provided with a siccative (2.5% of Nuodex Web Combi AQ, based on the solids content).

EXAMPLES 3 AND 4 AND COMPARATIVE EXAMPLE 6

The dispersions of Examples 3 and 4 and of Comparative Example 6 were prepared in accordance with the instructions set out in Comparative Example 5, but using different monomer compositions. These compositions are summarized in Table 2, which also sets out the properties of the dispersions.

TABLE 2

|  | Example 3 | Example 4 | Comp. Ex. 5 | Comp. Ex. 6 |
|---|---|---|---|---|
| Butyl acrylate | 45.00% | 51.00% | 45.00% | 57.00% |
| Methyl methacrylate | 36.00% | 39.00% | 39.00% | 39.00% |
| Methacryloyloxy-2-hydroxypropyl-linoleic ester | 15.00% | 7.50% | 15.00% | 0.00% |
| 4-Methacryloyloxy-benzophenone | 3.00% | 1.50% | 0.00% | 3.00% |
| Methacrylic acid | 1.00% | 1.00% | 1.00% | 1.00% |
| Viscosity | 279 mPas | 339 mPas | 289 mPas | 95.2 mPas |
| Particle radius | 63 nm | 63 nm | 63 nm | 70 nm |
| Solids content | 49.37% | 49.62% | 49.00% | 49.76% |
| pH | 9.0 | 9.4 | 9.1 | 9.4 |

EXAMPLE 5

A further inventive dispersion was prepared by mixing the dispersions of Comparative Examples 5 and 6, using a 50:50 weight ratio. The siccative, however, was added only after the polymer dispersions had been mixed.

Property investigations on the coating materials obtained in Examples 3 to 5 and Comparative Examples 5 and 6

The performance of the coating materials obtained in Examples 3 to 5 and Comparative Examples 5 and 6 was determined on the basis of a variety of methods. For this purpose, a blocking test, an abrasion test, a test for determining the pendulum hardness (by the König method), a crosshatch test in accordance with the DIN EN ISO 2409 standard, and a gloss investigation were carried out. In addition, the drying time was ascertained.

Test for Determining the Blocking Point

The blocking point was determined using polymer films 0.5 mm thick, the calculated quantities of the transparent coating materials (via area and solids content) being poured out onto the corresponding glass plates with silicone edge, and subjected to preliminary drying in the dark overnight. This was followed by exposure beneath a UV lamp.

Curing parameters:
Number of lamps: 4
Lamp type/power: Philips, TL 20W/05
Distance from sample: 5.5 cm
Measured UV output: 0.9 mW/cm$^2$ For determination of the blocking point, sections measuring approximately 100×20 mm were cut from the film. The films, approximately 0.5 mm thick, were affixed to Hostaphan film, folded centrally and placed between two glass plates. The films thus prepared were weighted down with weights of 500 g, producing a load of exactly 50 g/cm$^2$. The weights were preheated beforehand, starting from 30° C., up to a maximum of 150° C., and the test specimens were exposed at this temperature in a drying cabinet for 1 h.

The blocking point identifies the temperature at which the film attaches but still does not bond adhesively, and so the surface is still not damaged when the components are separated.

Abrasion Test

The films for the determination of the pendulum hardness were drawn down onto glass plates using a four-way film applicator, with a nominal wet film thickness of 200 μm, and were then subjected to exposure to daylight or UV radiation, as set out above (see Test for determining the blocking point). The exposure time was 7 days.

An abrasion instrument (Gardner straight line washability and abrasion machine) was used to wipe a felt strip impregnated with solvent (mineral spirit BP 80-110° C. or acetone) over the surface of the film. A peristaltic pump applied solvent dropwise to the film surface at a flow rate of 2 ml/min so that this surface never fully dried out.

Case 1: number of double rubs required until a section of the film has flaked/abraded. The exposed area must still be entirely surrounded by the film (max. 1500 double rubs).

Case 2: (value in brackets): the film is completely abraded over roughly a line in the direction of abrasion (this value is stated when Case 1 does not occur; max. 2500 double rubs).

Pendulum Hardness (König Method)

The films for the determination of the pendulum hardness were drawn down onto glass plates using a four-way film applicator, with a nominal wet film thickness of 200 μm, and were then subjected to UV exposure as set out above (see Test for determining the blocking point). The exposure time was 28 days. The measurement was conducted according to the method of König, using the pendulum curing instrument from BYK Mallinckrodt. In each case, the parameter was determined in duplicate on different areas of the drawn-down films, with subsequent formation of the average. The result was reported, after conversion of the required swings, by multiplication by a factor of 1.4, in seconds. The values reported relate to a measurement made after 28 days.

Crosshatch Test

For the conduct of the test, films with a wet thickness of 200 μm were applied to yellow-chromated Al panels (Henkel, Alodine 1200) using a four-way film applicator. The films were subsequently cured under UV light (see Test for determining the blocking point).

Using a crosshatch apparatus with 6 parallel blades, two cuts were made at a right angle to one another through the films. A strip of adhesive (Tesa®) was applied to the resulting crosshatch pattern, and removed. Evaluation was made in accordance with the DIN EN ISO 2409 standard.

Gloss Measurement

Films with a wet thickness of 200 μm were applied using a four-way film applicator. The substrate used was a black metal test panel (Metopac, Leneta). The films were exposed for 4 weeks under UV light (see test for determining the blocking point). The gloss of the films was determined after 28 days using the Picogloss instrument (model 503) from Erichsen, with an incident angle of 85°. 5-Fold determinations were carried out; the highest and lowest values were discarded, and the average was calculated from the remaining measurement values.

Drying Time (Tack-Free Time; Based on DIN 53150)

The films were drawn down using a four-way film applicator onto aluminum panels (Henkel, Alodine 1200) in a controlled-climate space at 23° C. and approximately 25% relative humidity, with a nominal wet film thickness of 100 μm, and then immediately subjected to the tests. For the determination of the tack-free time, a piece of paper (80 g/cm$^2$) and a rubber disc were placed on the film surface and loaded with a weight (20 g) for 60 s. Then weight and rubber disc were removed and the aluminum panel was dropped vertically from a height of 3-5 cm onto a surface. Drying degree 2 was attained when the piece of paper fell off.

TABLE 3

Properties of the coating materials obtained in Examples 3 to 5 and Comparative Examples 5 and 6

|  | Example 3 | Example 4 | Example 5 |
|---|---|---|---|
| Blocking point [° C.] | >150° C. | >150° C. | >150° C. |
| Abrasion test with acetone [number of double rubs] on curing with UV irradiation | 46 | 30 | 32 |
| Abrasion test with mineral spirit [number of double rubs] on curing with UV irradiation | >2500 | >2500 | >2500 |
| Abrasion test with acetone [number of double rubs] on curing with daylight | 35 | 29 | 32 |
| Abrasion test with mineral spirit [number of double rubs] on curing with daylight | >2500 | >2500 | >2500 |
| Pendulum hardness [s] | 30.1 | 15.4 | 14.7 |
| Crosshatch test | 1 | 0 | 0 |
| Gloss measurement at 85° | 59.5 | 63.0 | 88.7 |
| Drying time [h] | 18 | 24 | 24 |

|  | Comparative Example 5 | Comparative Example 6 |
|---|---|---|
| Blocking point [° C.] | >150° C. | >60° C. |
| Abrasion test with acetone [number of double rubs] on curing with UV irradiation | 38 | 31 |
| Abrasion test with mineral spirit [number of double rubs] on curing with UV irradiation | (2451) | >2500 |
| Abrasion test with acetone [number of | 18 | 28 |

TABLE 3-continued

Properties of the coating materials obtained in Examples 3 to 5 and Comparative Examples 5 and 6

| | | |
|---|---|---|
| double rubs] on curing with daylight | | |
| Abrasion test with mineral spirit [number of double rubs] on curing with daylight | (1466) | >2500 |
| Pendulum hardness [s] | 11.2 | 16.1 |
| Crosshatch test | 2 | 0 |
| Gloss measurement at 85° | 52.4 | 49.5 |
| Drying time [h] | 72 h | 24 h |

The data set out above show the synergistic improvement in the profile of properties of the coating materials of the invention. With comparable proportions of photoinitiator and unsaturated units in the polymer, unexpectedly large improvements were obtained in the strength of the films. Example 3 in particular shows the highest pendulum hardness and the best score in the abrasion test. Moreover, the data for Examples 4 and 5 demonstrate that these coating materials have a profile of properties which is superior to those of the comparative examples. For instance, the films of Examples 4 and 5 exhibit a blocking temperature which matches that of Comparative Example 5. The film of Comparative Example 6 exhibits a substantially lower temperature, but in the crosshatch test this film scores better than that of Comparative Example 5. This decrease in adhesion is not shown by the films of Examples 4 and 5. Also apparent here is the advantageous nature of the film obtained in Example 3, in comparison to that of Comparative Example 5. The very high pendulum hardness and the excellent abrasion resistance in comparison to both comparative examples suggests that the adhesion, on the basis of the assumed brittleness, would have to be lower than that of Comparative Example 5. Unexpectedly, however, it is found that the coating material of Example 3 has a somewhat better adhesion than that of Comparative Example 5. The film of Example 5 in particular, surprisingly, exhibits very high gloss values.

Furthermore, the results of the abrasion test show that for the improvement in abrasion resistance the coating materials of the comparative experiments must be cured by UV irradiation. This applies particularly clearly to the coating material of Comparative Example 5. Surprisingly, the examples of the present invention exhibit excellent strength even without UV irradiation. Correspondingly, the presence of (meth)acrylic polymers with units derived from (meth)acrylic monomers which in the alkyl radical have at least one double bond and 8 to 40 carbon atoms leads to a surprising increase in the activity of the photoinitiator that is likewise present in the coating material.

The invention claimed is:

1. A coating composition, comprising:
a photoinitiator; and
a (meth)acrylic polymer comprising, in polymerized form, a (meth)acrylic monomer of formula (IV):

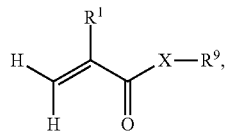

(IV)

wherein:
$R^1$ is hydrogen or methyl;
X is oxygen or a group of the formula NR', wherein R' is hydrogen or a radical comprising 1 to 6 carbon atoms; and
$R^9$ is a linear or branched alkyl radical comprising 8 to 40 carbon atoms and a C—C double bond,
wherein a maximum content of (meth)acrylic monomers comprising two or more (meth)acrylate groups, based on a total weight of polymerized monomers in the (meth)acrylate polymer, is 1% by weight, and
wherein the coating composition has a dynamic viscosity in a range from 10 to 500 mPas, measured in accordance with DIN EN ISO 2555 at 25° C.

2. The composition of claim 1, wherein the photoinitiator is activable by exposure to light having a wavelength in a range from 200 to 800 nm.

3. The composition of claim 1, wherein the photoinitiator is a compound having a molecular weight of less than 1000 g/mol.

4. The composition of claim 1, wherein the photoinitiator is a compound having a molecular weight of greater than or equal to 1000 g/mol.

5. The composition of claim 1, wherein the (meth)acrylic polymer comprises 0.5 to 60% by weight of the (meth)acrylic monomer.

6. The composition of claim 1, wherein the (meth)acrylic polymer has an iodine number in a range from 1 to 300 g iodine.

7. The composition of claim 1, wherein the (meth)acrylic polymer has a glass transition temperature in a range from −20 to 40° C.

8. The composition of claim 1, wherein the (meth)acrylic polymer is an emulsion polymer.

9. The composition of claim 1, wherein the (meth)acrylic polymer has a swelling factor of at least 2, measured at 20° C. with a tetrahydrofuran/water mixture.

10. The composition of claim 1, wherein the photoinitiator and the (meth)acrylic polymer are joined to one another via a bond, and the (meth)acrylic polymer comprises, in polymerized form, the photoinitiator monomer.

11. The composition of claim 1, wherein the (meth)acrylic polymer has an acid number in a range from 0.1 to 40 mg KOH/g, measured in accordance with DIN EN ISO 2114.

12. The composition of claim 1, further comprising:
an amine accelerant.

13. The composition of claim 1, in the form of an aqueous dispersion.

14. A process for producing a coating, the process comprising:
applying the coating composition of claim 1 to a substrate, to obtain a coated substrate; and
curing the coated substrate.

15. The process of claim 14, wherein the coating composition applied to the substrate is cured by exposure to light having a wavelength in a range from 200 to 800 nm,
wherein a luminous intensity of the light is in a range from 0.1 to 100 mW/cm².

16. A coated article, obtained by the process of claim 14.

17. The composition of claim 1, comprising a maximum of 0.5% by weight of (meth)acrylic monomers comprising two or more (meth)acryl ate groups, based on a total weight of monomers.

18. The composition of claim 1, comprising a maximum of 0.1% by weight of (meth)acrylic monomers comprising two or more (meth)acrylate groups, based on a total weight of monomers.

19. The composition of claim 1, wherein the photoinitiator is a photoinitiator monomer of formula (I) or a photoinitiator polymer comprising, in polymerized form, the photoinitiator monomer of formula (I):

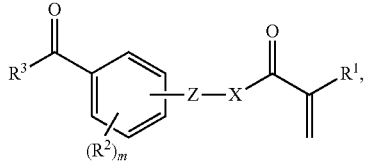
(I)

wherein:
$R^1$ is hydrogen or methyl;
$R^2$ is hydrogen, halogen, hydroxyl, or a radical comprising 1 to 20 carbon atoms;
$R^3$ is a radical comprising 1 to 20 carbon atoms;
X is oxygen or a group of formula NR', wherein R' is hydrogen or a radical comprising 1 to 6 carbon atoms;
m is an integer in the range from 0 to 4; and
Z is a bond or a linking group of formula (II):

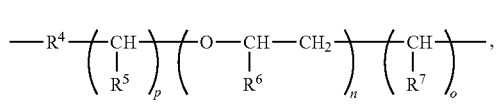
(II)

wherein:
$R^4$ is a bond, oxygen, sulphur, or a group of the formula NR', wherein R' is hydrogen or a radical comprising 1 to 6 carbon atoms, O—CO—O, HN—CO—O, HN—CO—NH, or a linking group comprising 1 to 20 carbon atoms;
$R^5$, $R^6$, and $R^7$ are each independently a hydrogen or methyl;
n is an integer from 0 to 200; and
o and p are each independently an integer from 0 to 2.

20. The composition of claim 19, wherein, in formula (I), $R^3$ is an aromatic or heteroaromatic radical.

21. The composition of claim 20, wherein the photoinitiator monomer of formula (I) has formula (III):

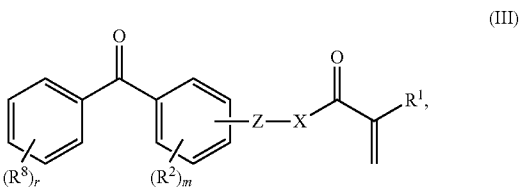
(III)

wherein:
$R^8$ is hydrogen, halogen, hydroxyl, or a radical comprising 1 to 20 carbon atoms; and
r is an integer from 0 to 5.

22. The composition of claim 21, wherein, in formula (III), Z is a linking group of formula (II), and wherein, in formula (II), n is an integer from 1 to 20.

23. The composition of claim 21, wherein, in formula (III), Z is a bond.

* * * * *